United States Patent
Shin

(10) Patent No.: US 11,193,873 B2
(45) Date of Patent: Dec. 7, 2021

(54) METHOD FOR CALCULATING TORTUOUS HYDRAULIC DIAMETER OF POROUS MEDIUM AND METHOD FOR ANALYZING FLOW IN POROUS MEDIUM USING SAME

(71) Applicant: KOREA GAS CORPORATION, Daegu (KR)

(72) Inventor: Chang Hoon Shin, Gyeonggi-do (KR)

(73) Assignee: KOREA GAS CORPORATION, Daegu (KR)

( * ) Notice: Subject to any disclaimer, the term of this patent is extended or adjusted under 35 U.S.C. 154(b) by 511 days.

(21) Appl. No.: 16/336,920

(22) PCT Filed: Sep. 29, 2017

(86) PCT No.: PCT/KR2017/010970
§ 371 (c)(1),
(2) Date: Mar. 27, 2019

(87) PCT Pub. No.: WO2018/062946
PCT Pub. Date: Apr. 5, 2018

(65) Prior Publication Data
US 2020/0025668 A1    Jan. 23, 2020

(30) Foreign Application Priority Data

Sep. 30, 2016 (KR) .................. 10-2016-0126756

(51) Int. Cl.
*G01N 15/08* (2006.01)
(52) U.S. Cl.
CPC ......... *G01N 15/0826* (2013.01); *G01N 15/08* (2013.01); *G01N 15/088* (2013.01); *G01N 15/0806* (2013.01); *G01N 2015/0833* (2013.01)

(58) Field of Classification Search
CPC .. G01N 15/08; G01N 15/0826; G01N 15/088; G01N 2015/0833
See application file for complete search history.

(56) References Cited

U.S. PATENT DOCUMENTS 11,099,292 B1 * 8/2021 Vinegar ............... G01N 24/081
2001/0042716 A1 * 11/2001 Iversen ................. C12M 29/18
210/640

(Continued)

FOREIGN PATENT DOCUMENTS

JP          2008501950 A      1/2008
KR        1020030011867       2/2003

(Continued)

OTHER PUBLICATIONS

Shin. C. H. et al., "A Smdy on the Numetical Analysis Method for the Porous Media Flow I Mixed wifo Fractmes"., Proceedings of the 2012 Fall Conference of Korean Society for Computational Flnids Engineering, Nov. 2012, pp. 265-273. See p. 268.

*Primary Examiner* — Nathaniel J Kolb
(74) *Attorney, Agent, or Firm* — Mayer & Williams, PC; Stuart H. Mayer

(57) ABSTRACT

Provided is a method of calculating a tortuous hydraulic diameter of a porous medium for laminar flow and turbulent flow considering a geometric feature and a friction loss feature. A method of calculating a tortuous hydraulic diameter of a porous medium, according to an embodiment of the present invention, includes providing porosity and a specific surface area of a porous medium, calculating a hydraulic diameter of the porous medium by using the porosity and the specific surface area, calculating tortuosity of the porous medium, and calculating a tortuous hydraulic diameter corresponding to a function of tortuosity, by using the hydraulic diameter and the tortuosity of the porous medium.

20 Claims, 25 Drawing Sheets

(56) References Cited

U.S. PATENT DOCUMENTS

| | | | |
|---|---|---|---|
| 2011/0283800 A1* | 11/2011 | Dukhin | G01V 3/082 |
| | | | 73/647 |
| 2016/0040531 A1* | 2/2016 | Ramakrishnan | G01V 1/40 |
| | | | 702/8 |
| 2021/0116354 A1* | 4/2021 | Khodja | G01N 23/04 |

FOREIGN PATENT DOCUMENTS

| | | |
|---|---|---|
| KR | 1020030011867 A | 2/2003 |
| KR | 1020140038512 | 3/2014 |

* cited by examiner

[FIG. 1]
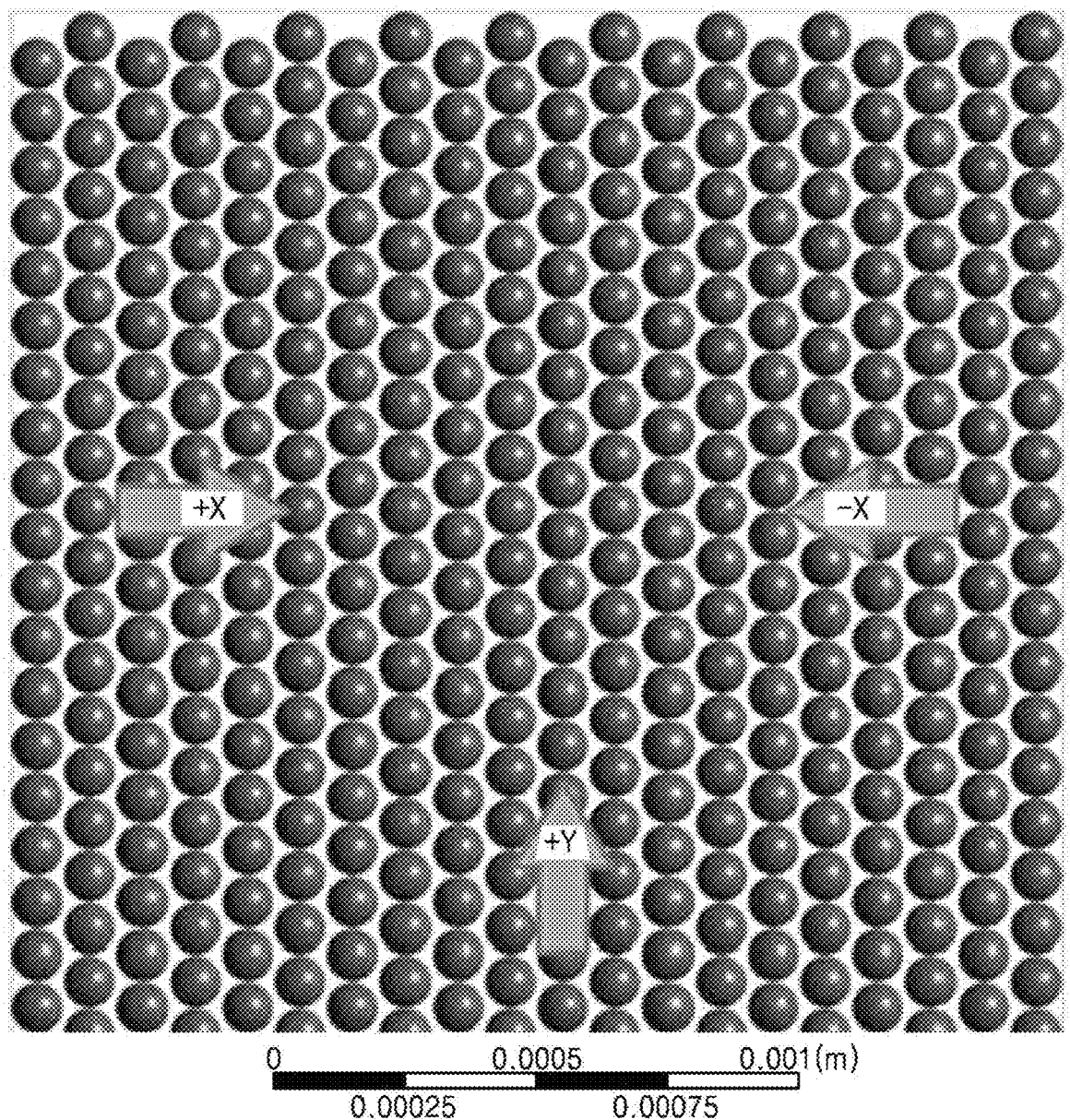

[FIG. 2]
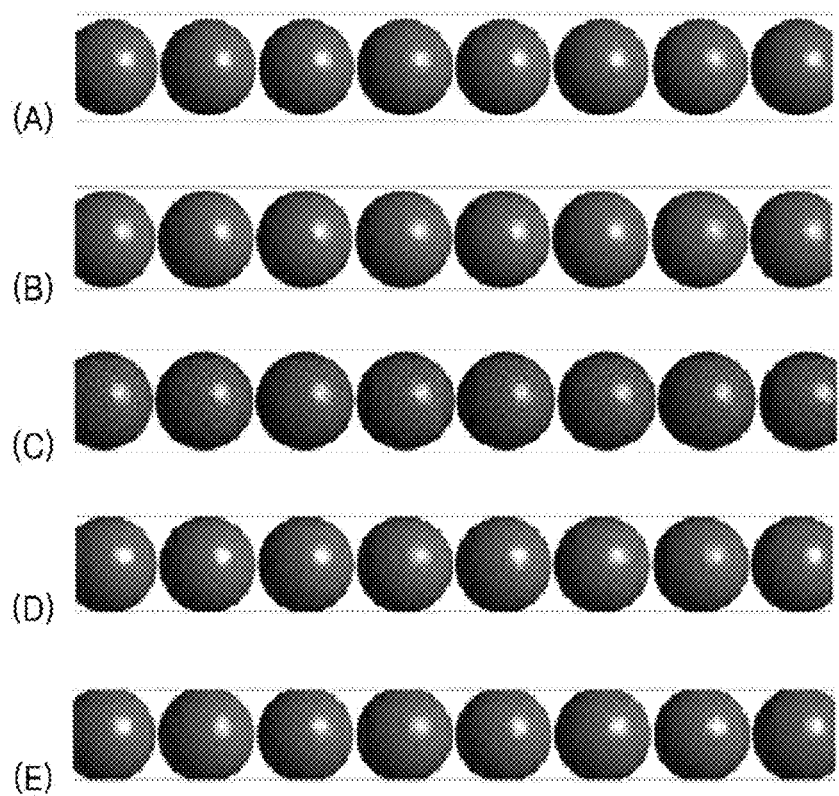

[FIG. 3]
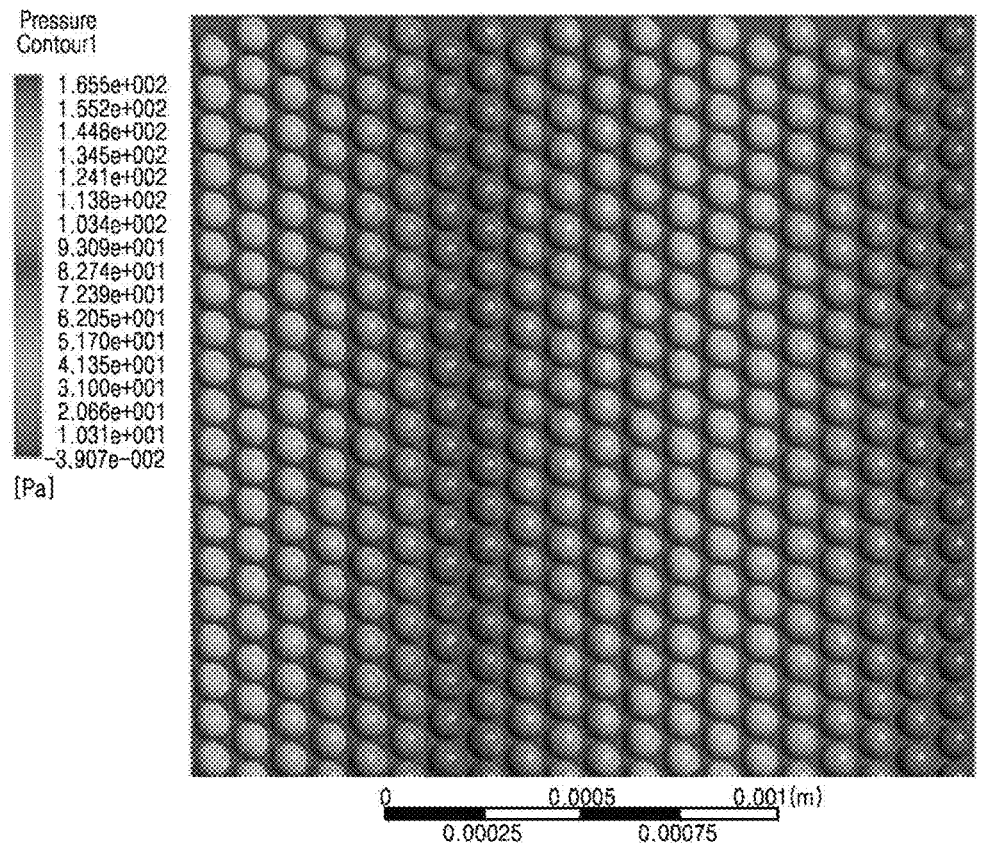
[FIG. 4]
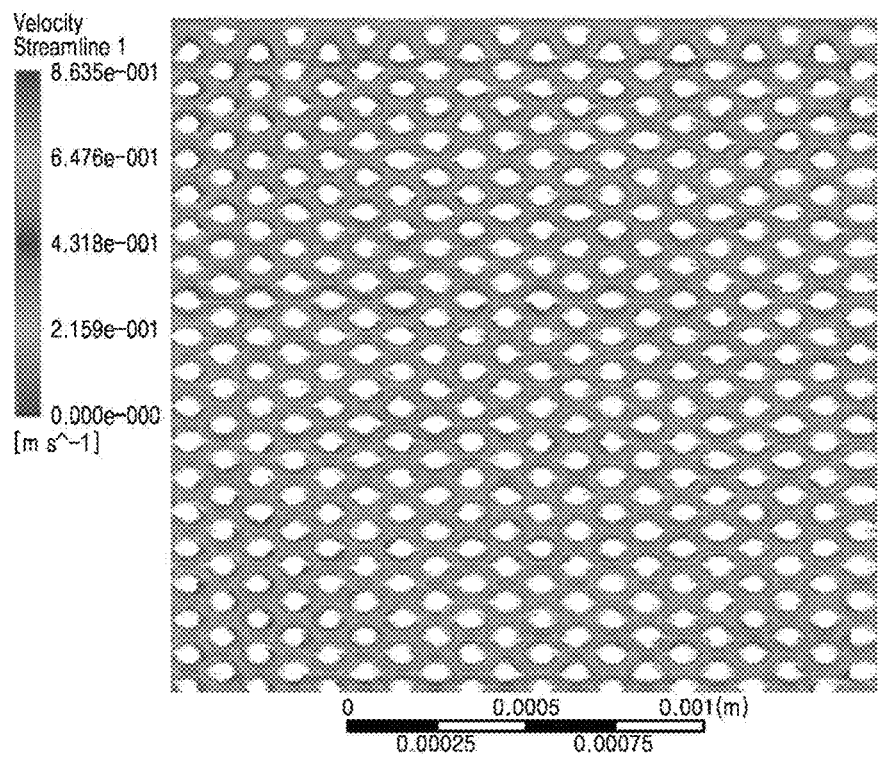

[FIG. 5]
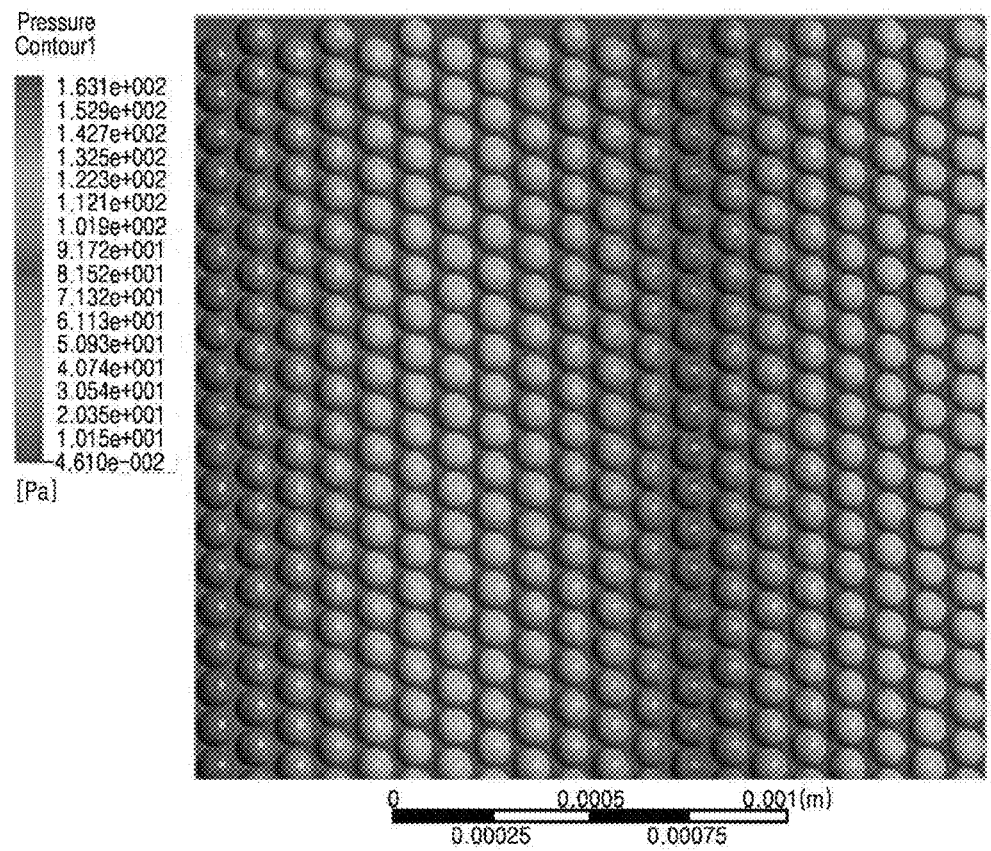
[FIG. 6]
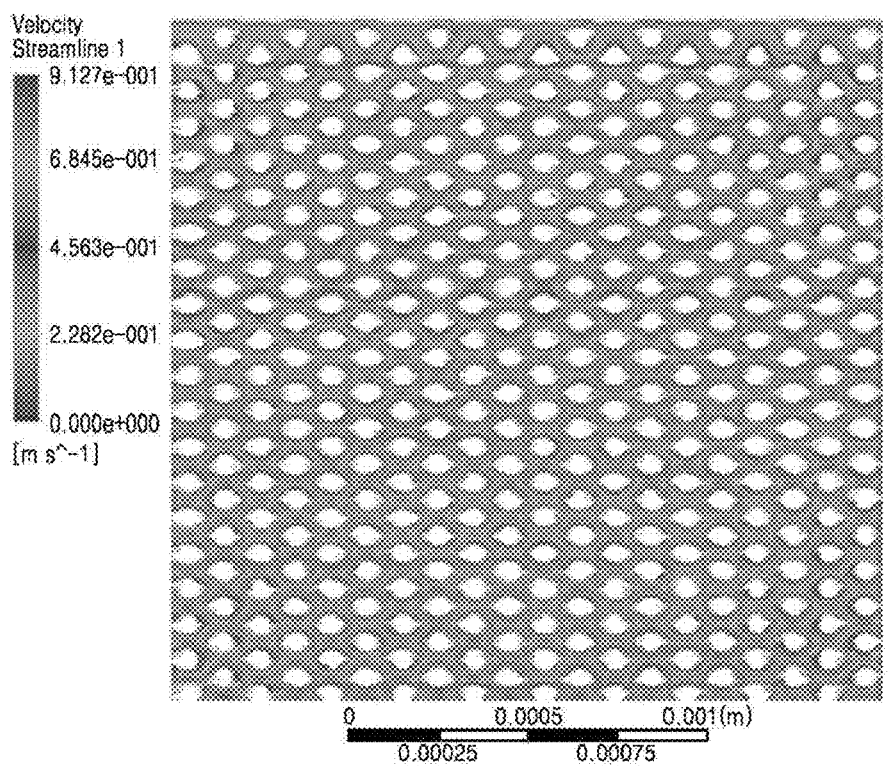

[FIG. 7]
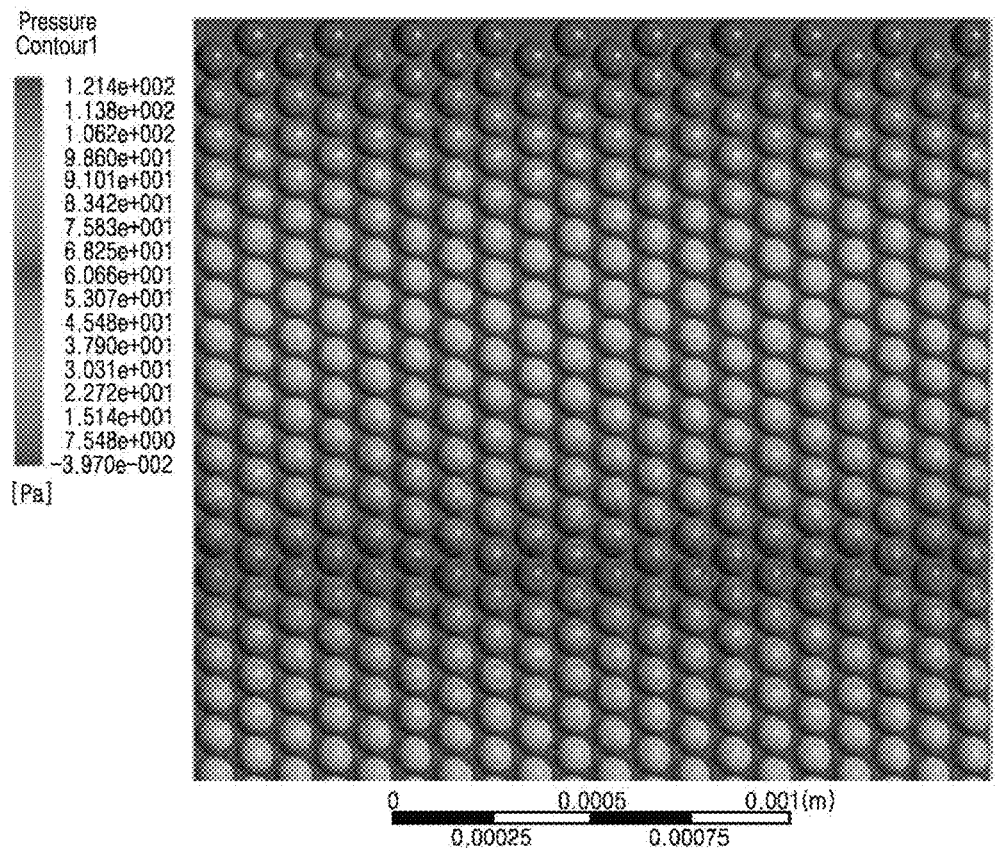
[FIG. 8]
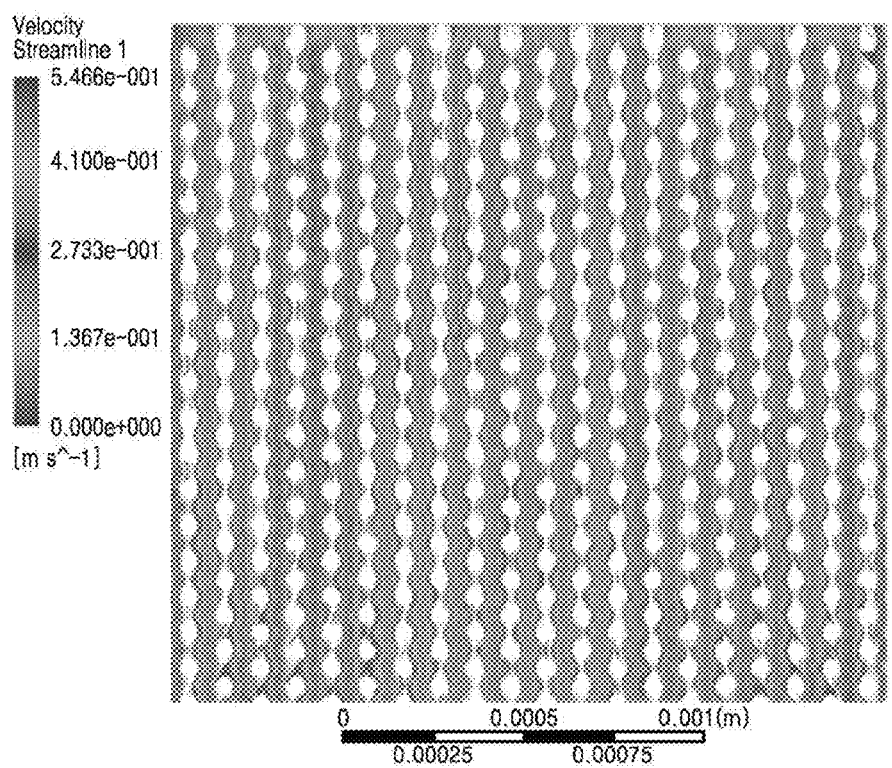

[FIG. 9]
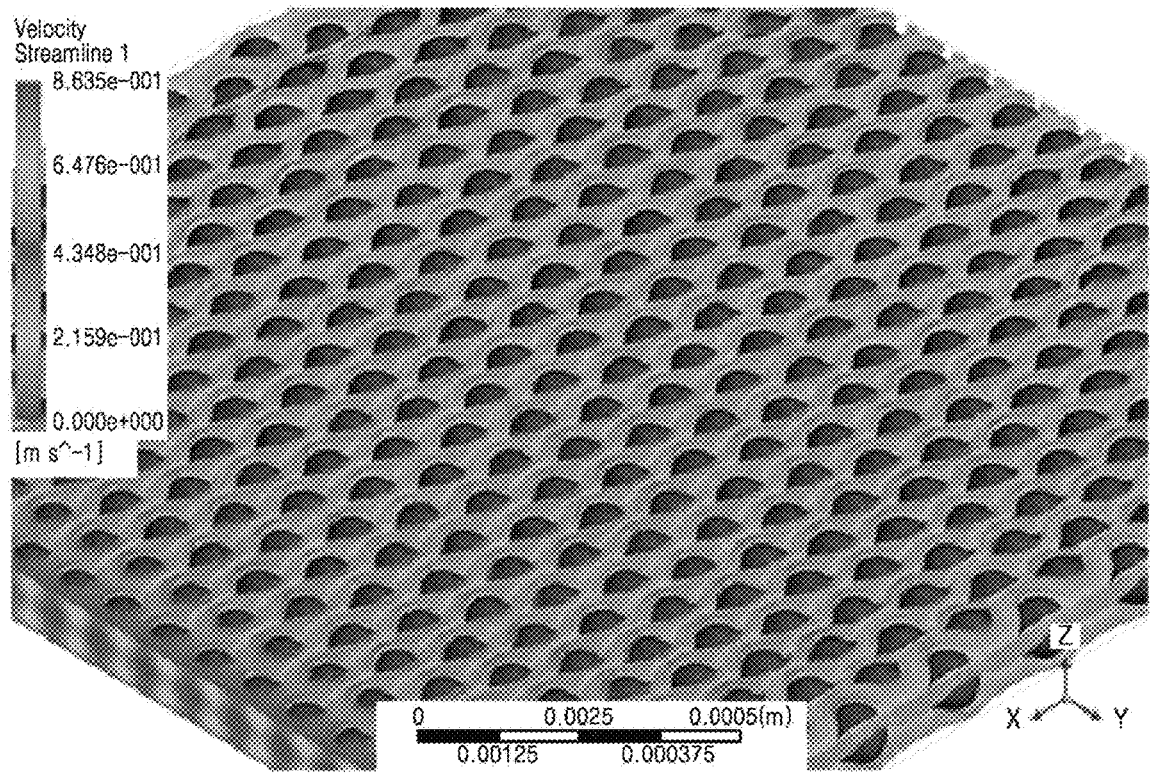
[FIG. 10]
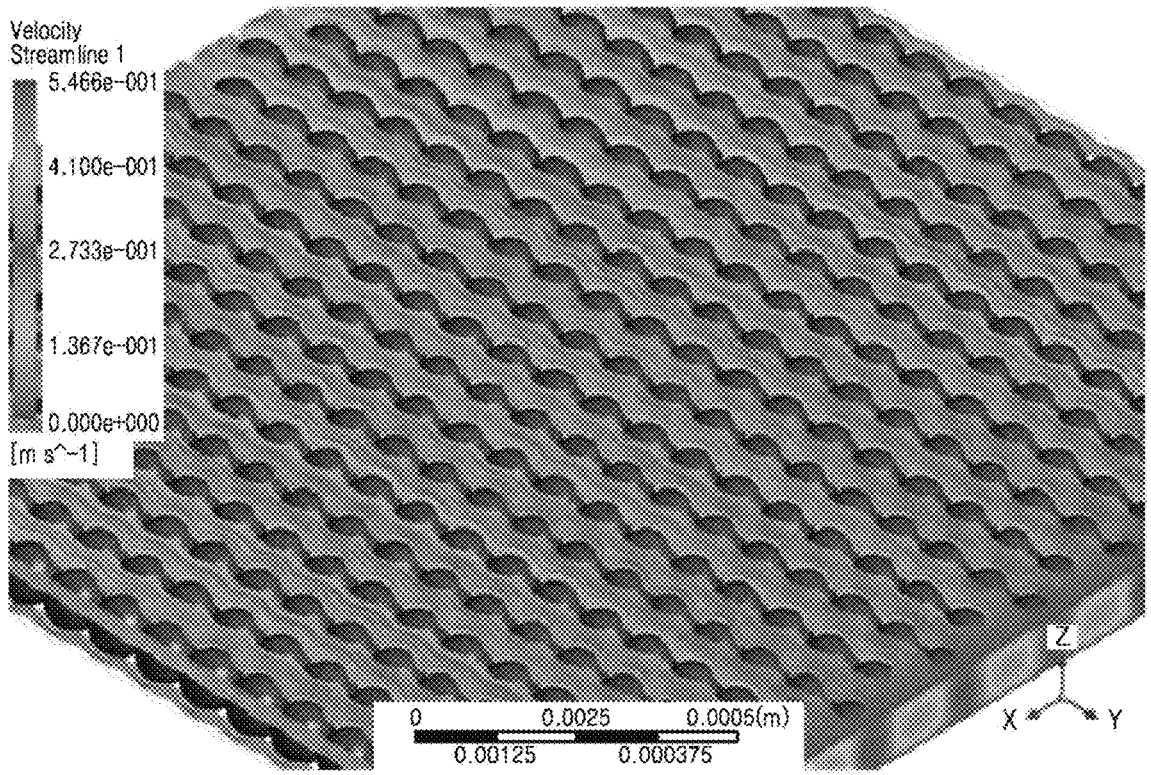

[FIG. 11]
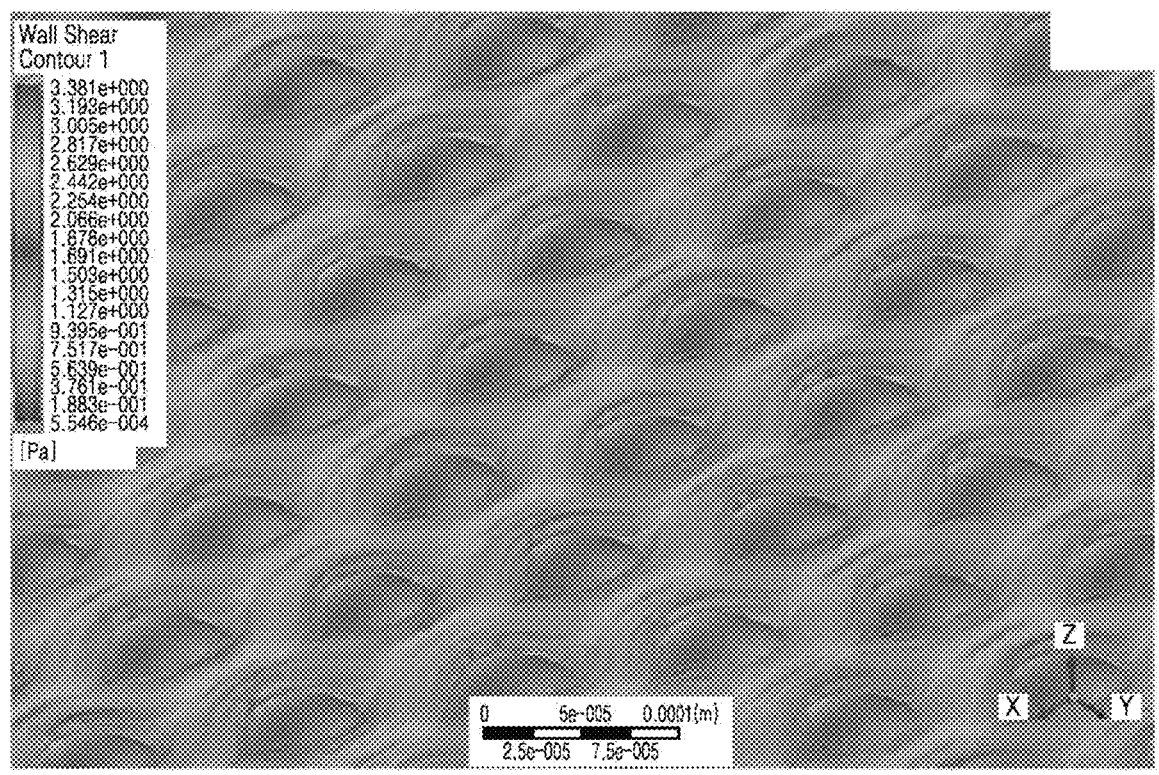
[FIG. 12]
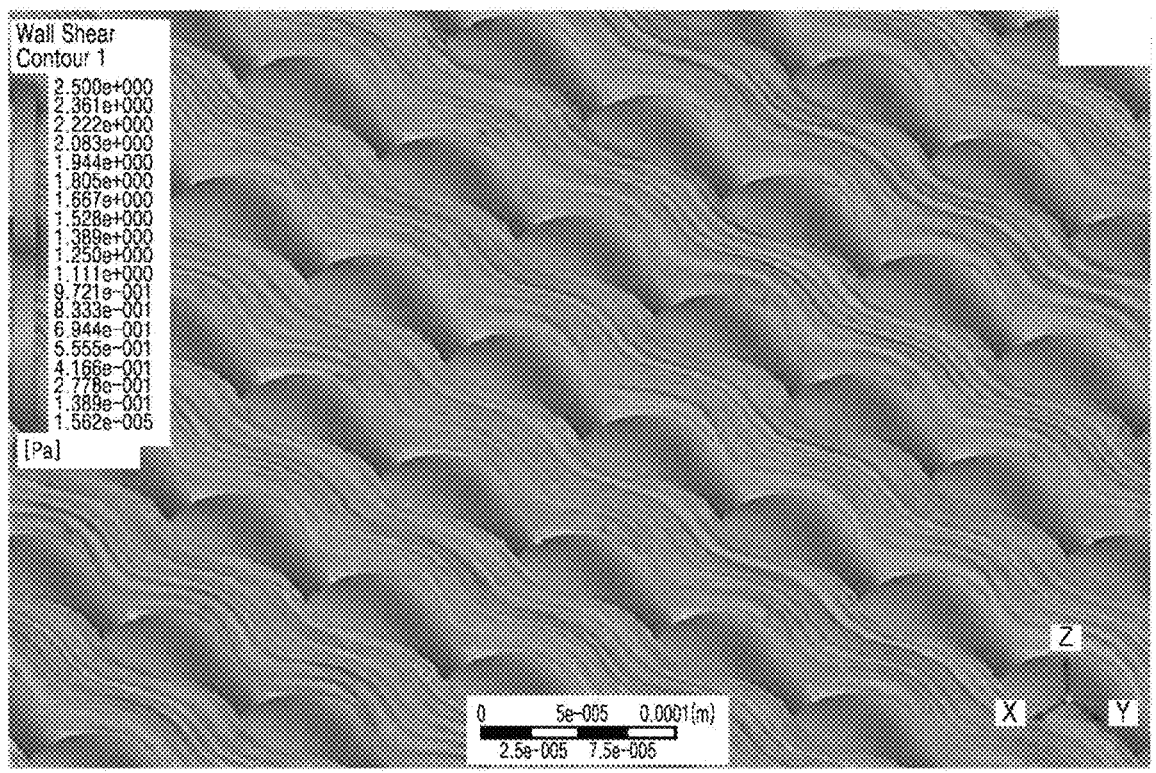

[FIG. 13]
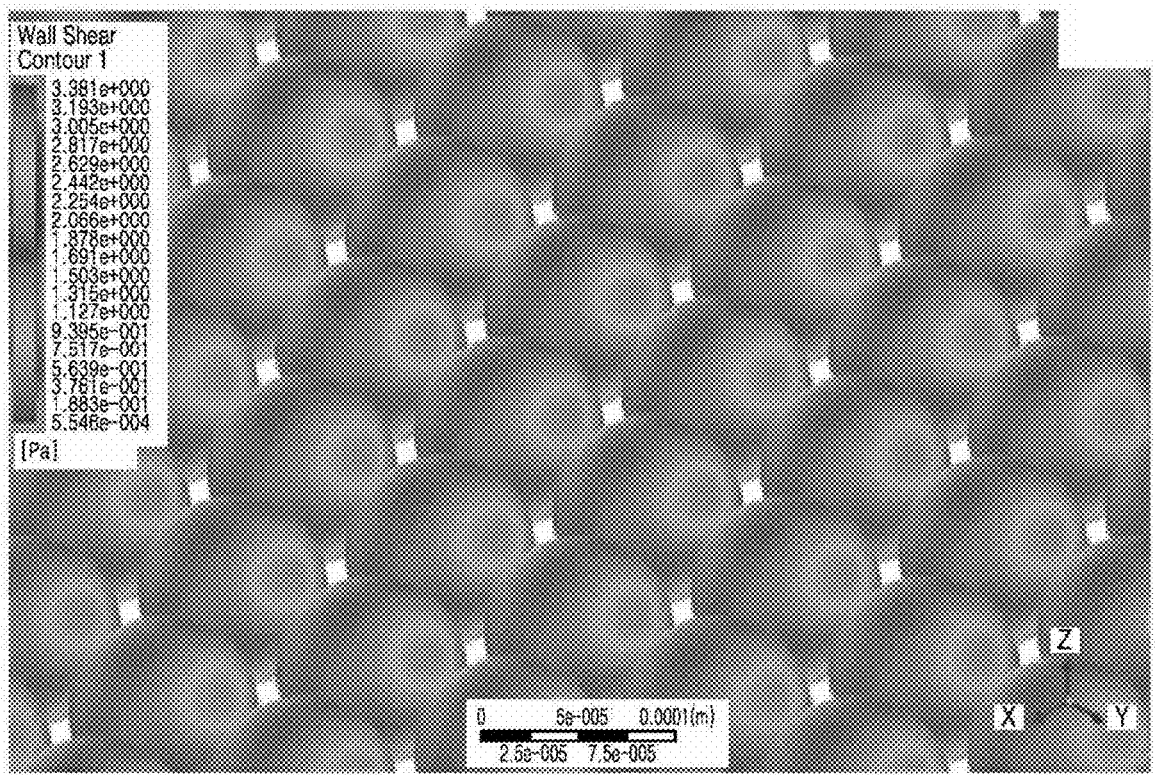
[FIG. 14]
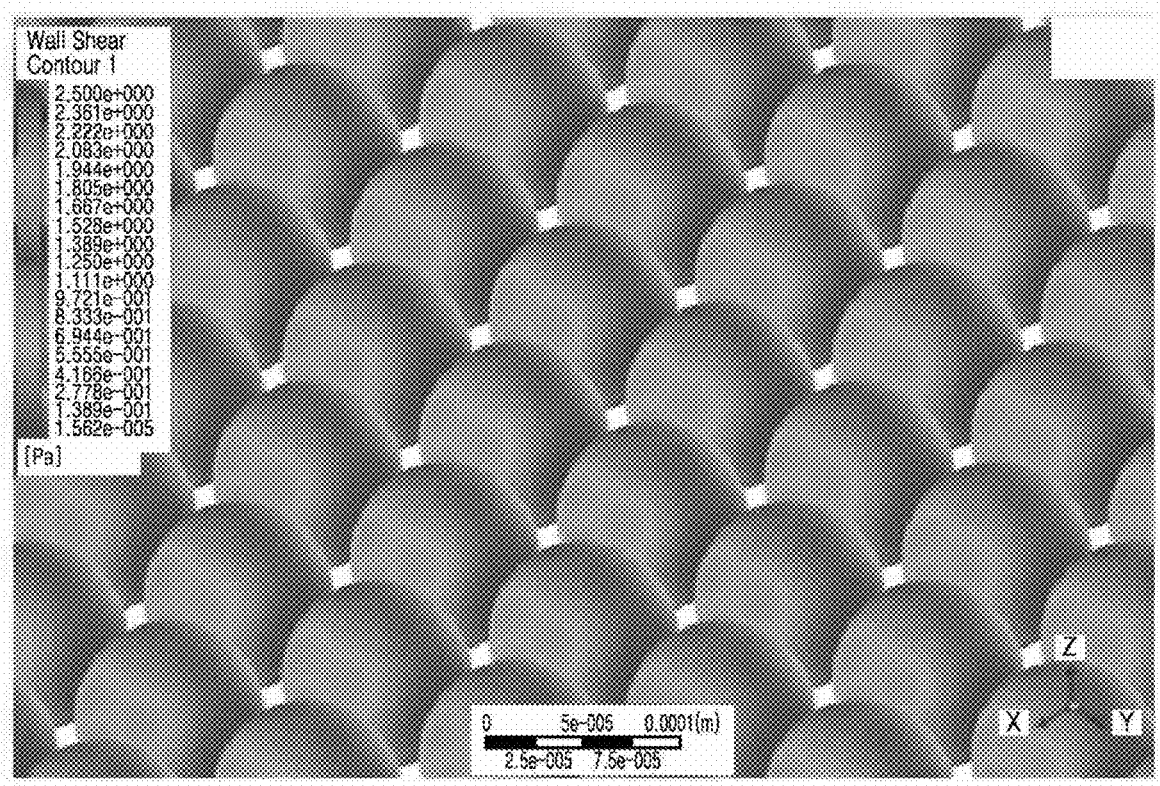

[FIG. 15]
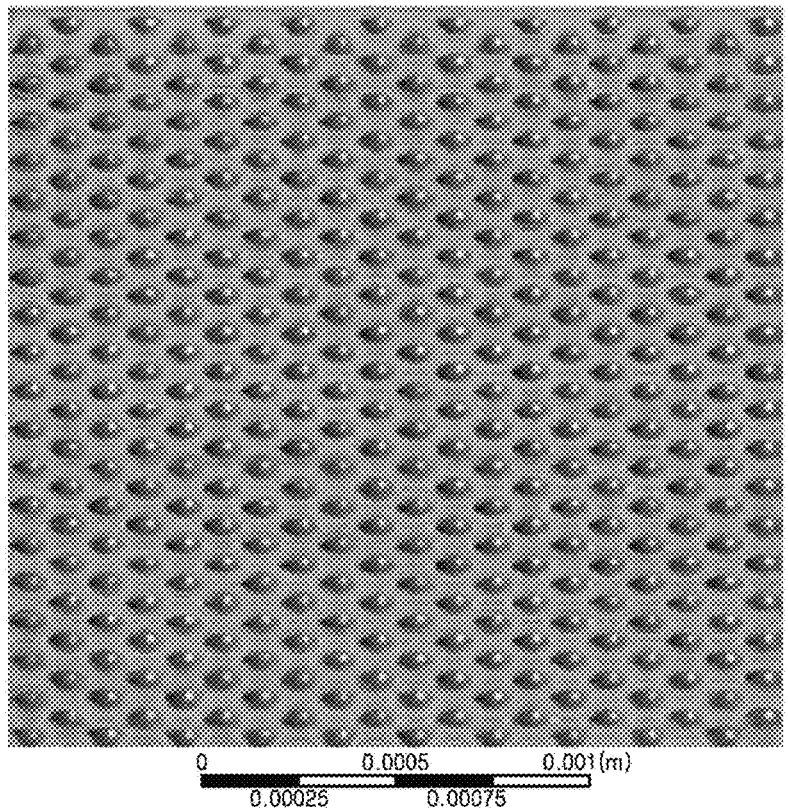
[FIG. 16]
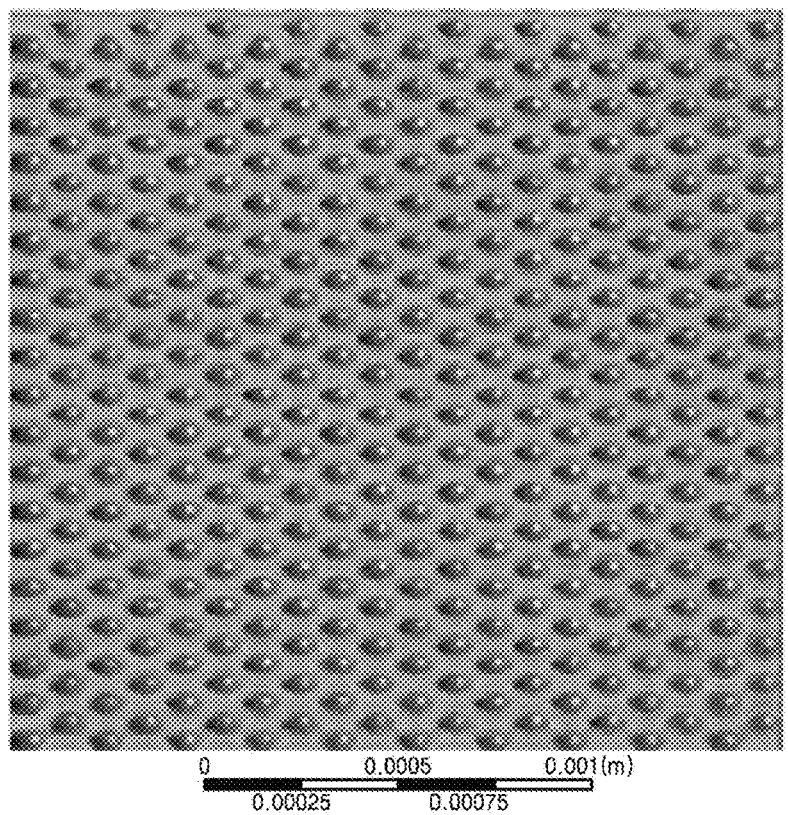

[FIG. 17]
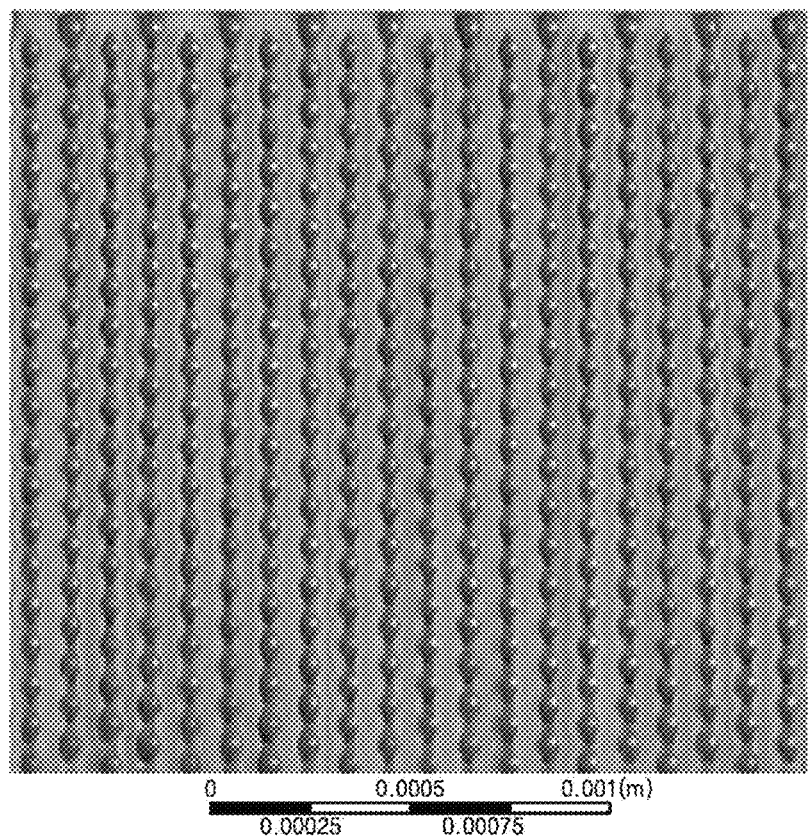

[FIG. 18]
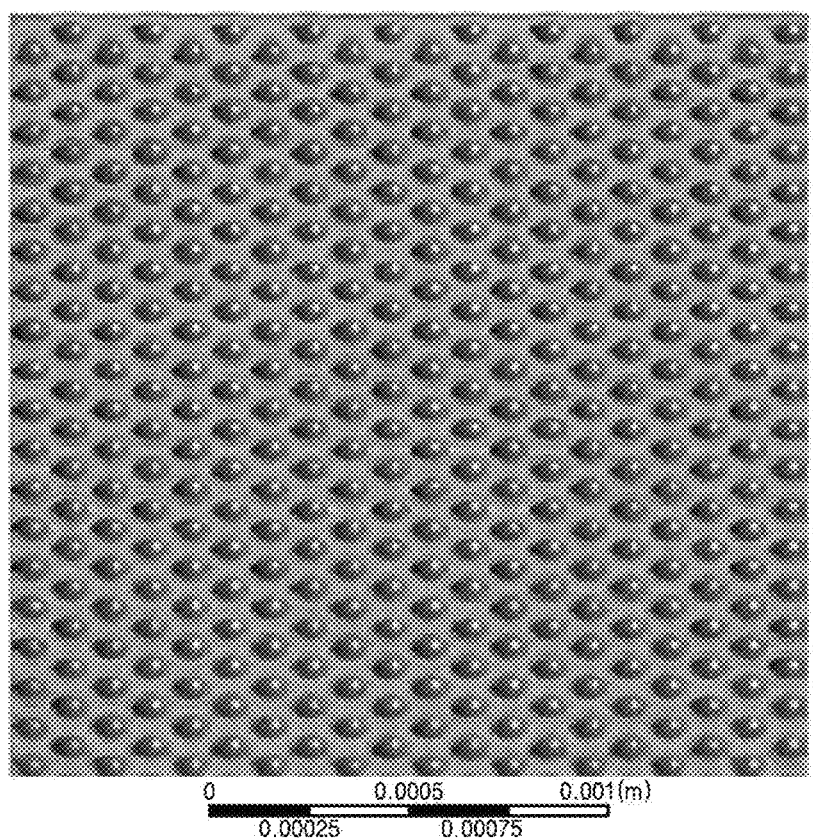

[FIG. 19]
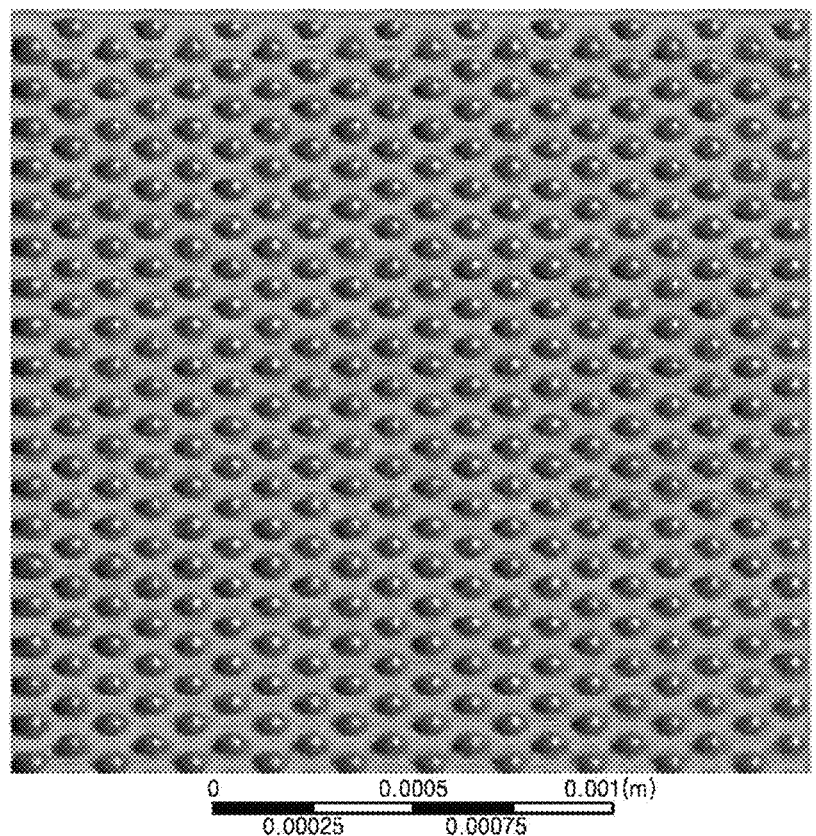

[FIG. 20]
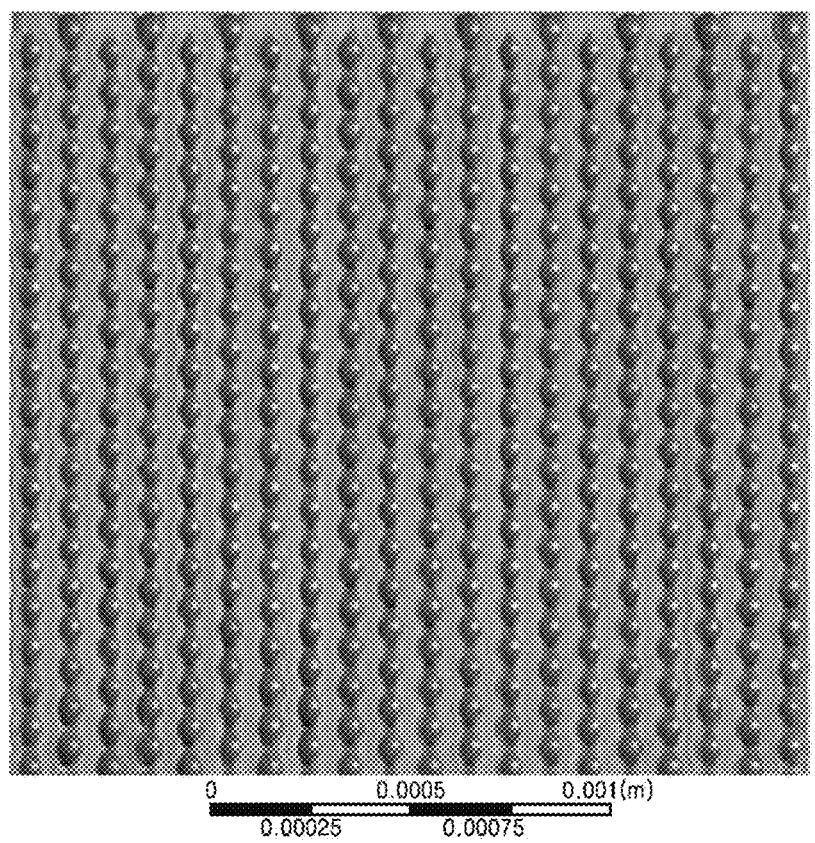

[FIG. 21]
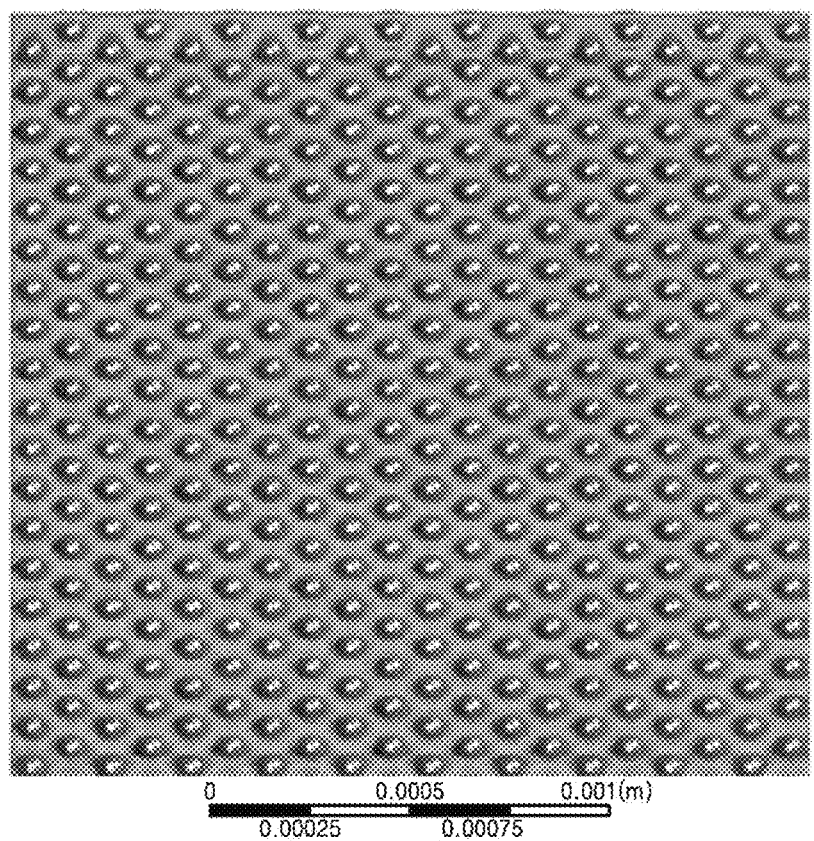

[FIG. 22]
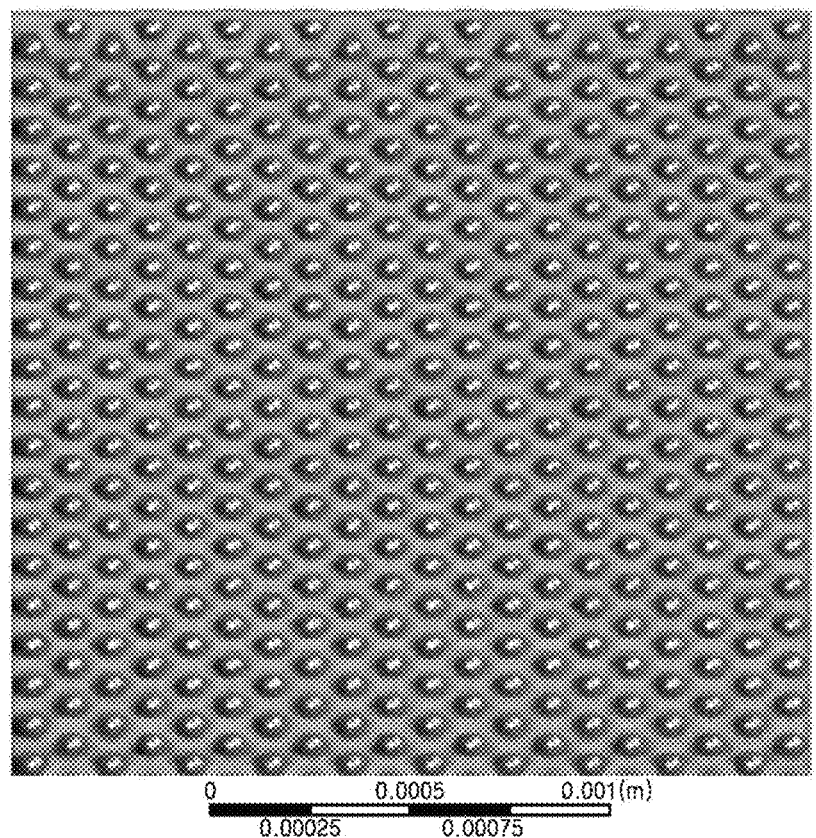

[FIG. 23]
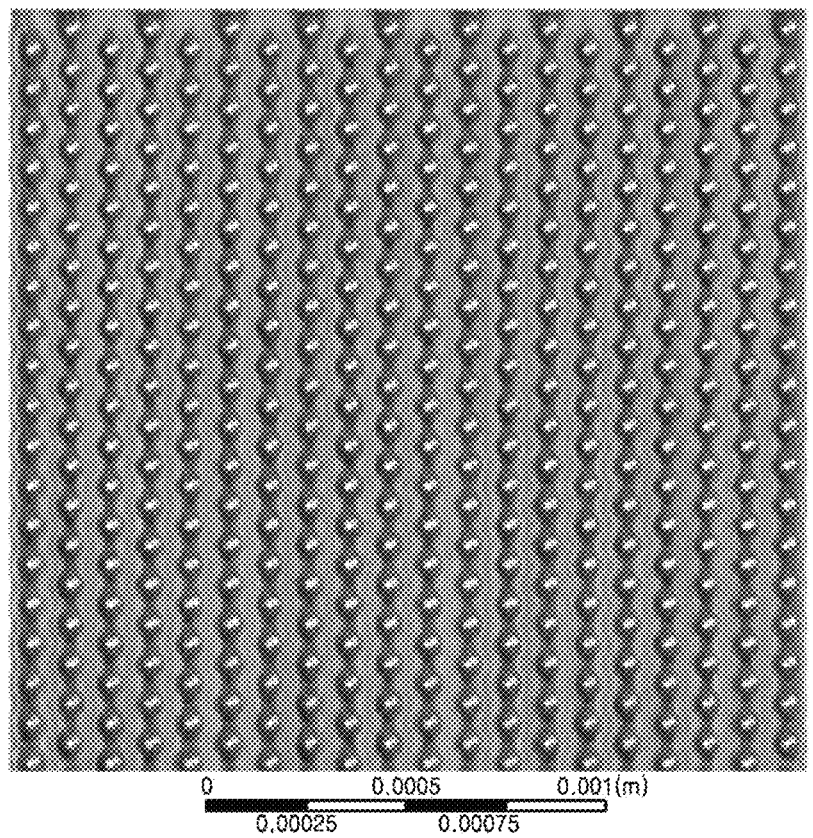

[FIG. 24]
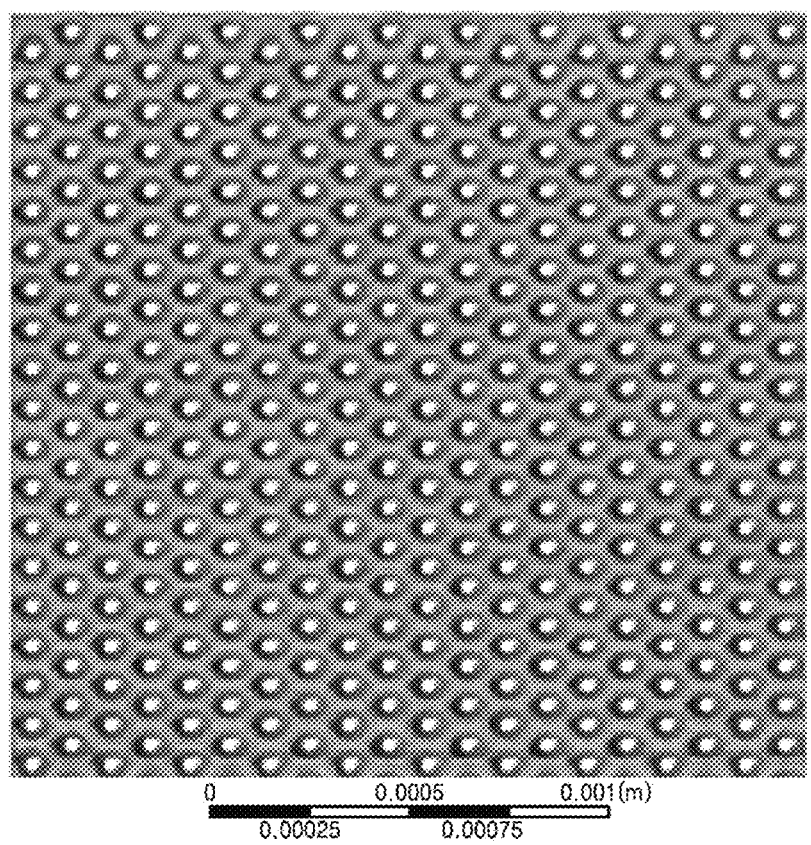

[FIG. 25]
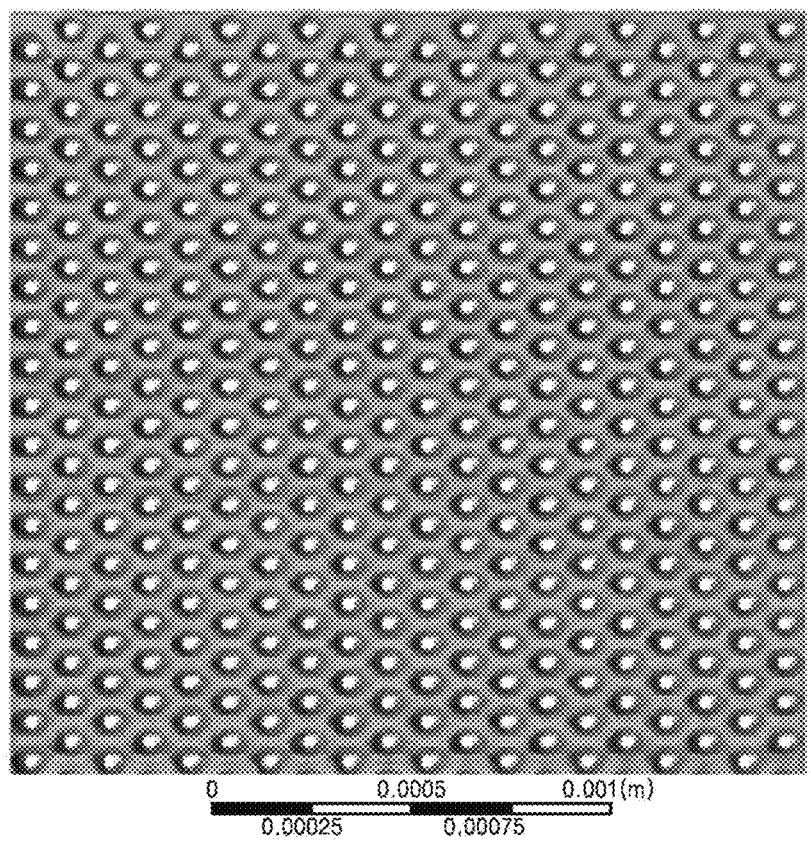

[FIG. 26]
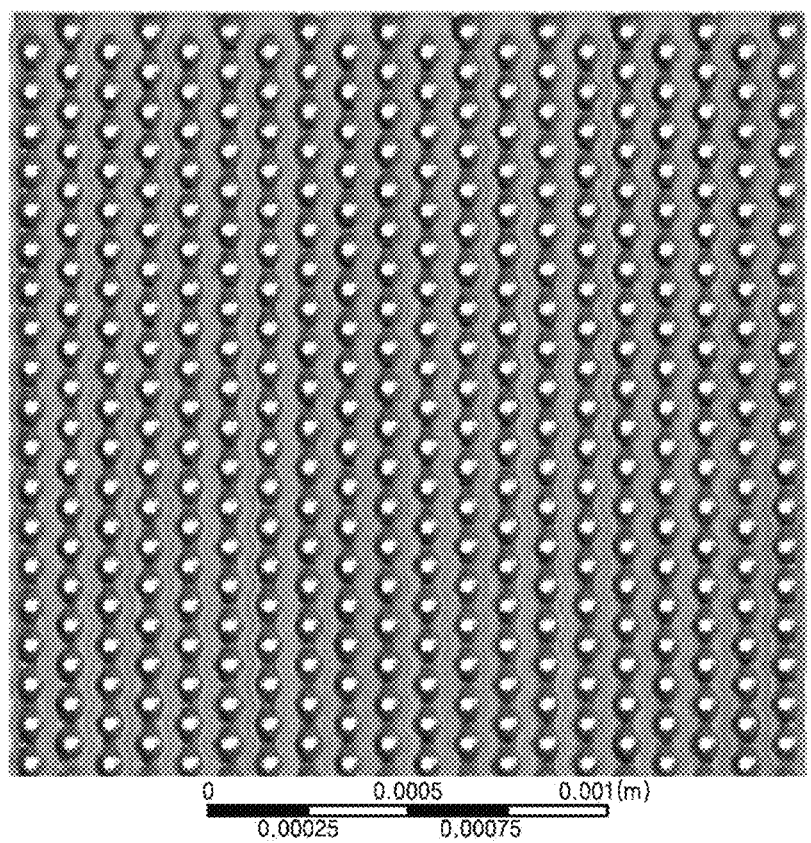

[FIG. 27]
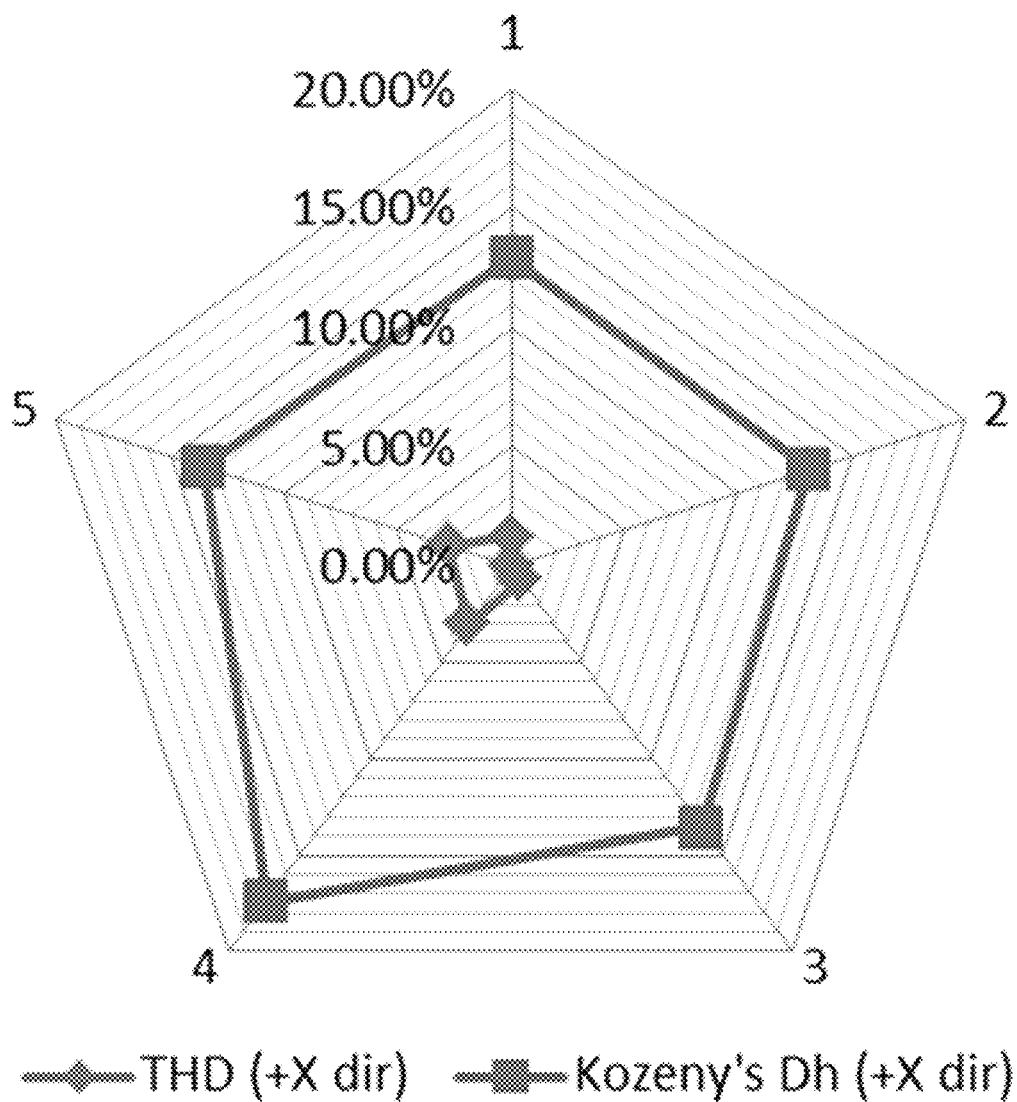

[FIG. 28]
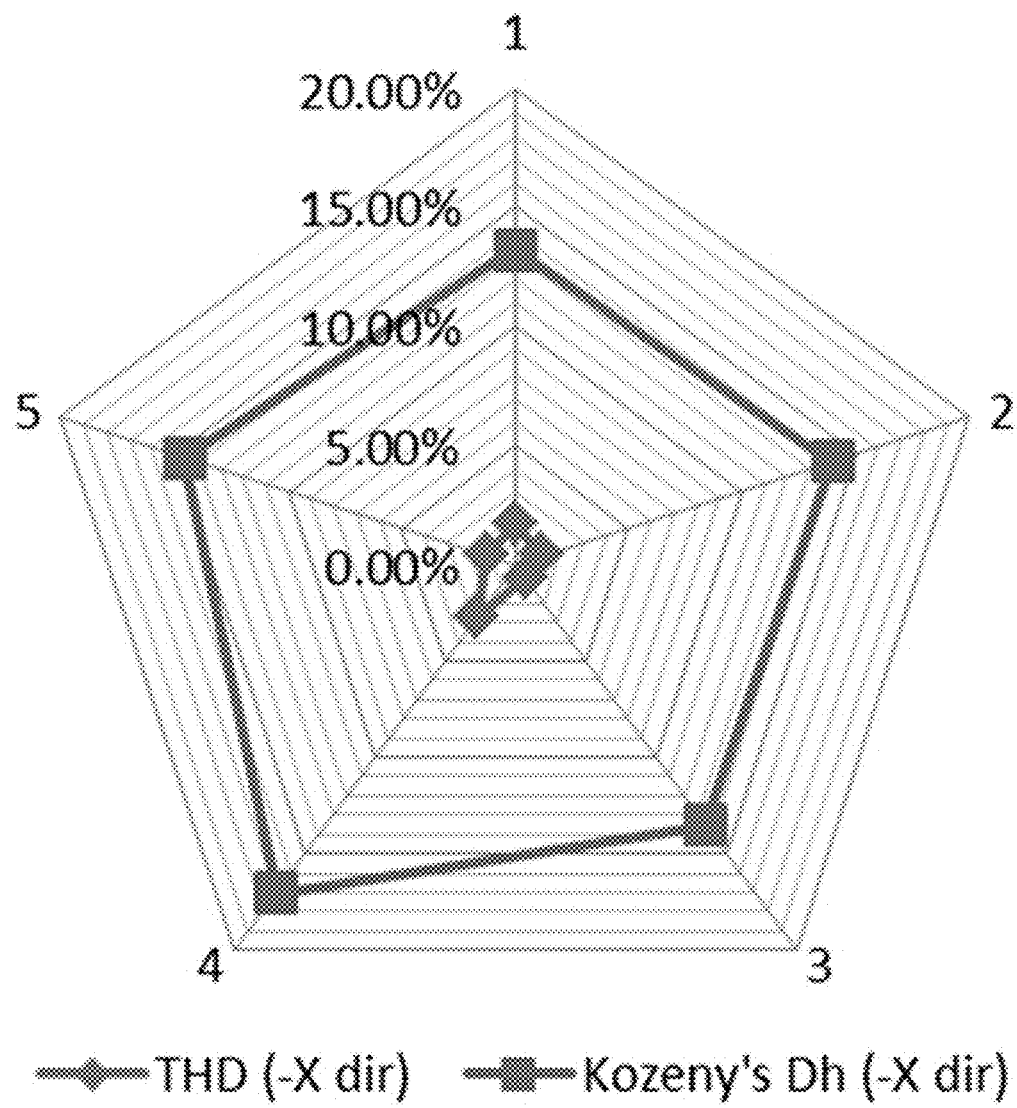

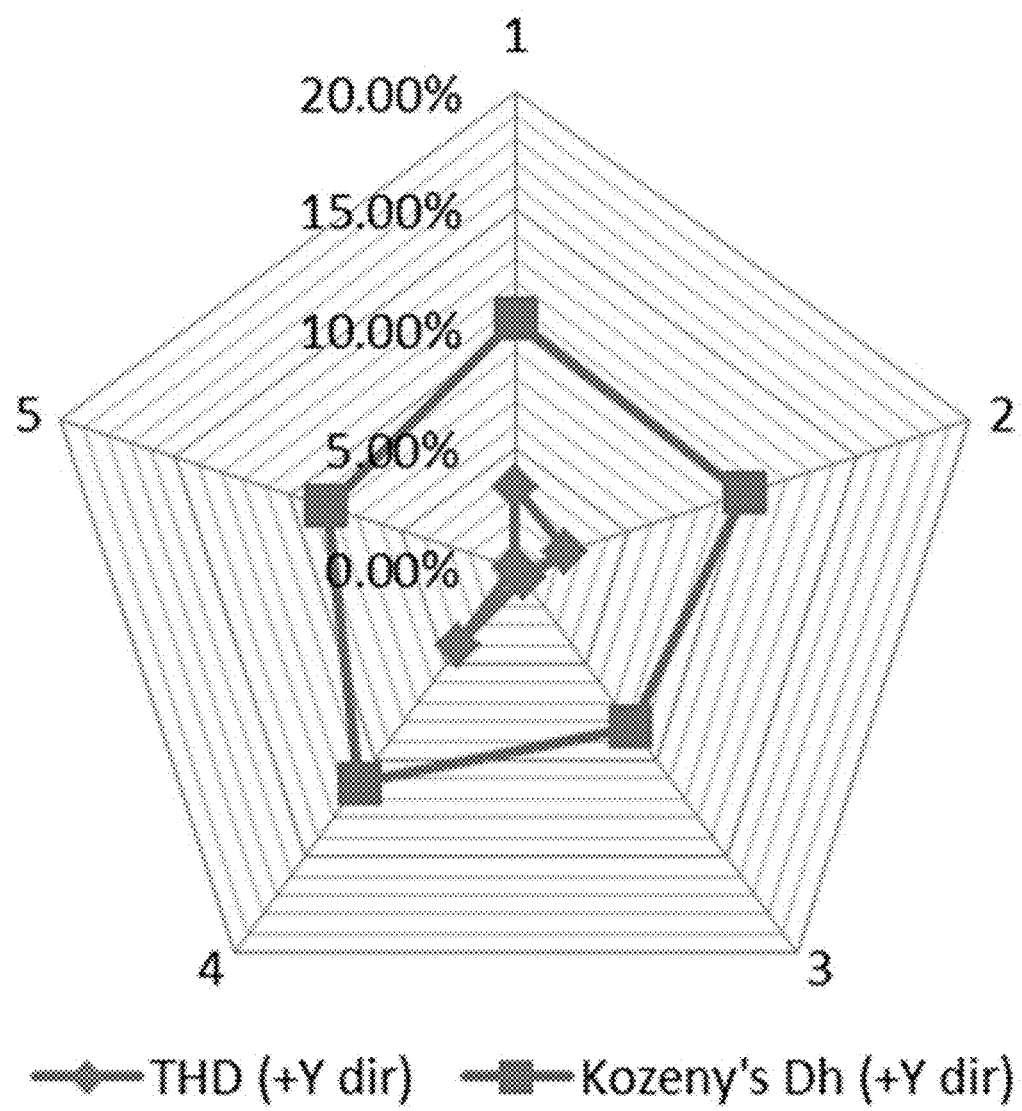
[FIG. 29]

[FIG. 30]
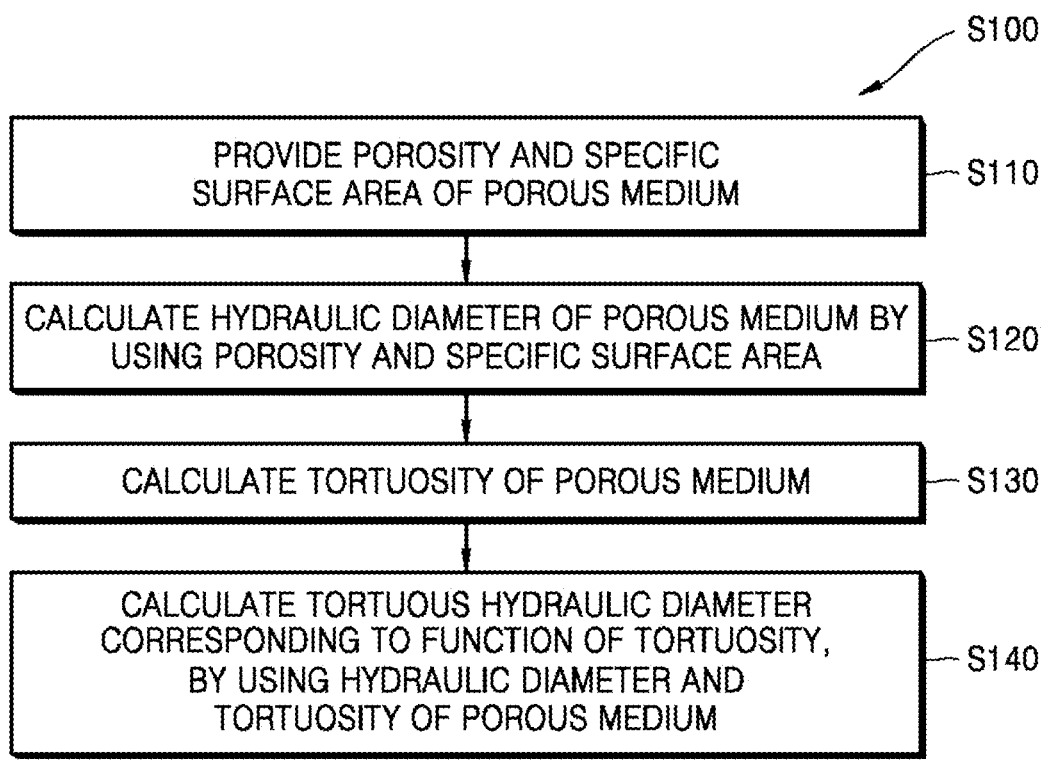

[FIG. 31]
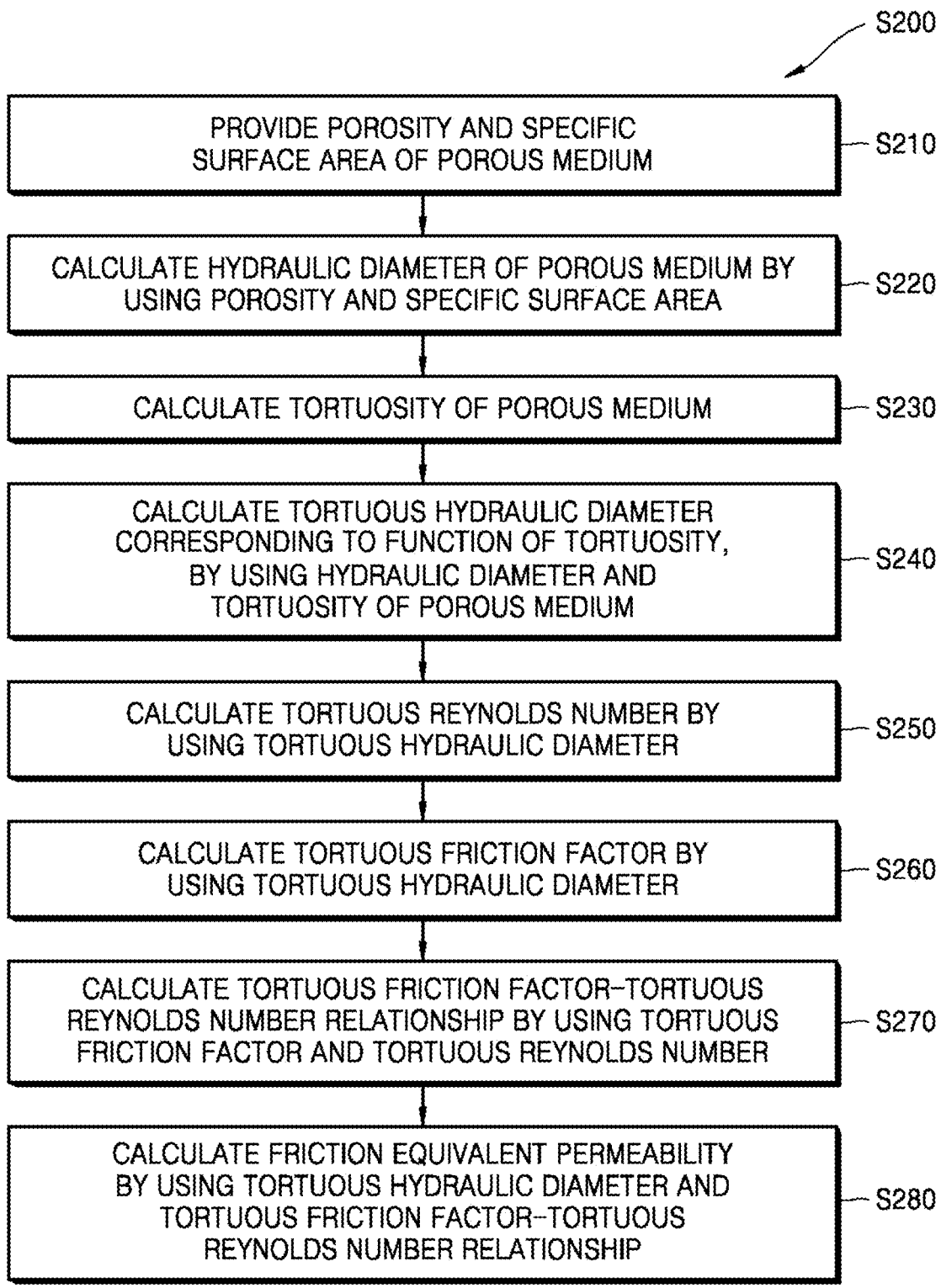

[FIG. 32]
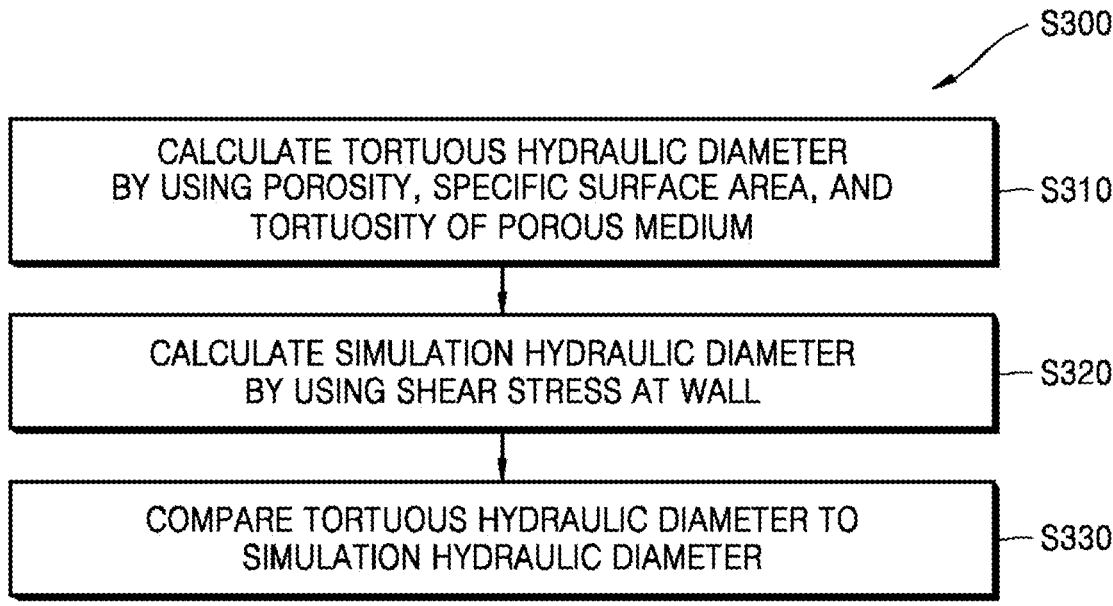
[FIG. 33]
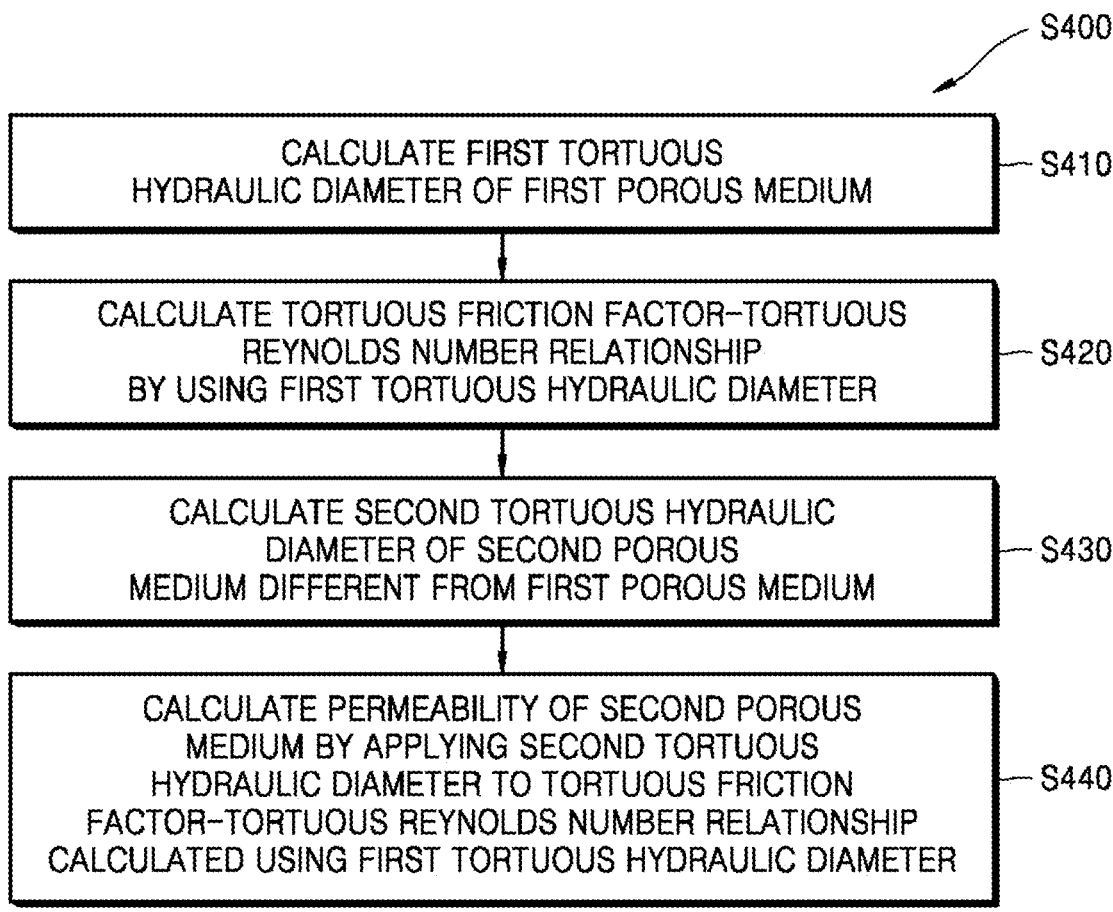

METHOD FOR CALCULATING TORTUOUS HYDRAULIC DIAMETER OF POROUS MEDIUM AND METHOD FOR ANALYZING FLOW IN POROUS MEDIUM USING SAME

TECHNICAL FIELD

The present invention relates to a method of analyzing flow in a porous medium, and more particularly, to a method of calculating a tortuous hydraulic diameter of a porous medium, and a method of analyzing flow in a porous medium by using the tortuous hydraulic diameter.

The present invention is proposed with reference to Research Project No. 20132510100060 supported by the Korea Institute of Energy Technology Evaluation and Planning (KETEP), granted financial resource from the Ministry of Trade, Industry & Energy, Republic of Korea.

BACKGROUND ART

Estimation of permeability of a porous medium has been a major subject of research for a long time in various academic fields, e.g., petroleum gas, nuclear energy, biomechanics, and civil engineering. Nevertheless, a generalized permeability estimation method capable of appropriately considering geometric features of various media and applicable to turbulent flow as well as laminar flow has not been introduced (Shin, 2012). A rheological relationship of porous flow is generally represented as the Darcy equation or the Forchheimer equation (Rubinstein 1989). However, these equations merely disclose a simple proportional relationship of a flow rate and permeability, and do not disclose a dominant feature variable of permeability or a correlation therebetween. As such, in general, permeability is directly measured based on experiments or is approximately estimated based on comparison with porosity or the like. This requires numerous experiments on various types of rocks and thus considerable consumption of costs and time is required. Therefore, a permeability equation generally applicable to analysis of porous flows having various geometric features and flow ranges needs to be proposed.

A representative example of theoretical approach methods to permeability by prior researchers includes a method of estimating permeability based on easily measurable rock properties such as porosity (Nelson, 1994). Historically, as an initial approach, an empirical equation for measuring permeability of saturated sandstone has been obtained by Hazen (1892). Thereafter, Kozeny (1927) and Carman (1937, 1938, 1956) have disclosed an equation based on a tube-like model of rock pore space, which is known as the Kozeny-Carman equation (Muskat 1946; Paterson 1983). The basic idea of the present study is that a pore flow path of a porous medium is treated as a micropipe having an equivalent flow feature. In this case, prior researchers have disclosed features of a micropore flow path based on microscopic and geometric factors such as a grain shape, a pore size, and roughness of rock or a medium (Achdou 1992). Although these disclosures are conceptually possible, measurement of numerous individual grain sizes and shapes and quantification of the same into a representative value are intricate problems to be solved (Burmeister 1993).

DETAILED DESCRIPTION OF THE INVENTION

Technical Problem

The present invention provides a method of calculating a tortuous hydraulic diameter of a porous medium for laminar flow and turbulent flow considering a geometric feature and a friction loss feature.

The present invention also provides a method of analyzing flow in a porous medium by using a method of calculating a tortuous hydraulic diameter of a porous medium for laminar flow and turbulent flow considering a geometric feature and a friction loss feature.

However, the scope of the present invention is not limited thereto.

Technical Solution

According to an aspect of the present invention, there is provided a method of calculating a tortuous hydraulic diameter of a porous medium, the method including providing porosity and a specific surface area of a porous medium, calculating a hydraulic diameter of the porous medium by using the porosity and the specific surface area, calculating tortuosity of the porous medium, and calculating a tortuous hydraulic diameter corresponding to a function of tortuosity, by using the hydraulic diameter and the tortuosity of the porous medium.

The tortuous hydraulic diameter may have a relationship defined by an equation shown below, with the tortuosity.

$$D_{h_T} = D_h \cdot T^{\frac{1}{4}}$$

(where $D_{h_T}$ is a tortuous hydraulic diameter, $D_h$ is a hydraulic diameter not considering tortuosity, and T is tortuosity.)

The tortuous hydraulic diameter may have a relationship defined by an equation shown below, with the tortuosity.

$$D_{h_T} = \frac{4\phi}{S_{S_T}} = \left(\frac{4\phi}{S_S}\right) \cdot \left(\frac{L}{L_e}\right)^{1/2}$$

(where $D_{h_T}$ is a tortuous hydraulic diameter, $\varphi$ is porosity of a porous medium, $S_{S_T}$ is a specific surface area considering tortuosity, $S_S$ is a specific surface area not considering tortuosity, L is a length of the porous medium, and $L_e$ is a length of an equivalent pore flow path.)

According to another aspect of the present invention, there is provided a method of analyzing flow in a porous medium, the method including providing porosity and a specific surface area of a porous medium, calculating a hydraulic diameter of the porous medium by using the porosity and the specific surface area, calculating tortuosity of the porous medium, calculating a tortuous hydraulic diameter corresponding to a function of tortuosity, by using the hydraulic diameter and the tortuosity of the porous medium, calculating a tortuous Reynolds number by using the tortuous hydraulic diameter, and calculating a tortuous friction factor by using the tortuous hydraulic diameter.

The tortuous Reynolds number may have a relationship defined by an equation shown below, with the tortuosity.

$$Re_{v_T} = \frac{\rho v D_{h_T}}{\mu} = \frac{\rho u D_{h_T}}{\phi \mu}\left(\frac{L_e}{L}\right) = Re_{u_T}\phi^{-1}T^{\frac{1}{2}}$$

$$= Re_u \phi^{-1} T^{-\frac{1}{4}}$$

(where $Re_{v_T}$ is a function of tortuosity and is a tortuous Reynolds number based on a flow velocity v, $Re_{u_T}$ is a function of tortuosity and is a tortuous Reynolds number based on a flow velocity u, $Re_u$ is a Reynolds number not considering tortuosity, ρ is a density, v is a flow velocity of a fluid through an equivalent pore flow path, $D_{hT}$ is a tortuous hydraulic diameter, μ is viscosity of the fluid, u is a flow velocity of the fluid, φ is porosity of a porous medium, L is a length of the porous medium, $L_e$ is a length of the equivalent pore flow path, and T is tortuosity.)

The tortuous Reynolds number may have a relationship defined by an equation shown below, with the tortuosity.

$$Re_{u_T} = \frac{\rho u D_{h_T}}{\mu} = Re_u \cdot T^{\frac{1}{4}}$$

(where $Re_{uT}$ is a function of tortuosity and is a tortuous Reynolds number based on a flow velocity u, $Re_u$ is a Reynolds number not considering tortuosity, ρ is a density, u is a flow velocity of a fluid, $D_{hT}$ is a tortuous hydraulic diameter, μ is viscosity of the fluid, and T is tortuosity.)

The tortuous friction factor may have a relationship defined by an equation shown below, with the tortuosity.

$$f_{v_T} = -\left(\frac{2D_{h_T}}{\rho v^2}\frac{\Delta P}{L_e}\right) = -\left(\frac{2D_{h_T}}{\rho u^2}\frac{\Delta P}{L}\right)\phi^2\left(\frac{L}{L_e}\right)^3$$
$$= f_{u_T}\phi^2 T^{\frac{3}{2}}$$
$$= f_u \phi^2 T^{\frac{7}{4}}$$

(where $f_{vT}$ is a function of tortuosity and is a tortuous friction factor based on a flow velocity v, $f_{uT}$ is a function of tortuosity and is a tortuous friction factor based on a flow velocity u, $f_u$ is a friction factor not considering tortuosity, $D_{hT}$ is a tortuous hydraulic diameter, ρ is a density, v is a flow velocity of a fluid through an equivalent pore flow path, $\Delta P/L_e$ is a pressure gradient based on a length of the equivalent pore flow path, u is a flow velocity of the fluid, $\Delta P/L$ is a pressure gradient based on a length of a porous medium, φ is porosity of the porous medium, L is a length of the porous medium, $L_e$ is a length of the equivalent pore flow path, and T is tortuosity.)

The tortuous friction factor may have a relationship defined by an equation shown below, with the tortuosity.

$$f_{u_T} = -\left(\frac{2D_{h_T}}{\rho u^2}\frac{\Delta P}{L}\right) = -\left(\frac{2D_h}{\rho u^2}\frac{\Delta P}{L}\right)\left(\frac{L}{L_e}\right)$$
$$= f_u \cdot T^{\frac{1}{4}}$$

(where $f_{uT}$ is a function of tortuosity and is a tortuous friction factor based on a flow velocity u, $f_u$ is a friction factor not considering tortuosity, $D_{hT}$ is a tortuous hydraulic diameter, ρ is a density, u is a flow velocity of a fluid, $\Delta P/L$ is a pressure gradient based on a length of a porous medium, $D_h$ is a hydraulic diameter not considering tortuosity, L is a length of the porous medium, $L_e$ is a length of an equivalent pore flow path, and T is tortuosity.)

The tortuous hydraulic diameter may have a relationship defined by an equation shown below, with the tortuosity.

$$D_{h_T} = D_h \cdot T^{\frac{1}{4}}$$

(where $D_{hT}$ is a tortuous hydraulic diameter, $D_h$ is a hydraulic diameter not considering tortuosity, and T is tortuosity)

The tortuous hydraulic diameter may have a relationship defined by an equation shown below.

$$D_{h_T} = \frac{4\phi}{S_{S_T}} = \left(\frac{4\phi}{S_S}\right) \cdot \left(\frac{L}{L_e}\right)^{1/2}$$

(where $D_{hT}$ is a tortuous hydraulic diameter, φ is porosity of a porous medium, $S_{ST}$ is a specific surface area considering tortuosity, $S_S$ is a specific surface area not considering tortuosity, L is a length of the porous medium, and $L_e$ is a length of an equivalent pore flow path.)

A flow velocity of a fluid in the porous medium may have a relationship defined by an equation shown below.

$$u = -\frac{2D_{h_T}^2 \cdot \phi T}{\mu \cdot f_{v_T} Re_{v_T}} \frac{\Delta P}{L}$$

(where u is a flow velocity of a fluid, $D_{hT}$ is a tortuous hydraulic diameter, φ is porosity of a porous medium, T is tortuosity, μ is viscosity of the fluid, v is a flow velocity of the fluid through an equivalent pore flow path, $f_{vT}$ is a function of tortuosity and is a tortuous friction factor based on the flow velocity v, $Re_{vT}$ is a function of tortuosity and is a tortuous Reynolds number based on the flow velocity v, and $\Delta P/L$ is a pressure gradient based on a length.)

A flow velocity of a fluid in the porous medium may have a relationship defined by an equation shown below.

$$u = -\frac{2D_{h_T}^2}{\mu \cdot f_{u_T} Re_{u_T}} \frac{\Delta P}{L}$$

(where u is a flow velocity of a fluid, μ is viscosity of the fluid, $f_{uT}$ is a function of tortuosity and is a tortuous friction factor based on the flow velocity u, $Re_{uT}$ is a function of tortuosity and is a tortuous Reynolds number based on the flow velocity u, $D_{hT}$ is a tortuous hydraulic diameter, and $\Delta P/L$ is a pressure gradient based on a length.)

The method may further include calculating a tortuous friction factor-tortuous Reynolds number relationship by using the tortuous friction factor and the tortuous Reynolds number, after calculating the tortuous friction factor.

The tortuous friction factor-tortuous Reynolds number relationship may be defined by an equation shown below.

$$f_{v_T} Re_{v_T} = -\left(\frac{2D_{h_T}}{\rho v^2}\frac{\Delta P}{L_e}\right)\left(\frac{\rho v D_{h_T}}{\mu}\right) = -\left(\frac{2D_{h_T}^2}{\mu \cdot u}\frac{\Delta P}{L}\right)\phi\left(\frac{L}{L_e}\right)^2$$
$$= f_{u_T} Re_{u_T} \cdot \phi T$$

(where $f_{vT}$ is a function of tortuosity and is a tortuous friction factor based on a flow velocity v, $f_{uT}$ is a function of tortuosity and is a tortuous friction factor based on a flow velocity u, $Re_{vT}$ is a function of tortuosity and is a tortuous Reynolds number based on the flow velocity v, $Re_{uT}$ is a function of tortuosity and is a tortuous Reynolds number based on the flow velocity u, $D_{hT}$ is a tortuous hydraulic diameter, ρ is a density, v is a flow velocity of a fluid through an equivalent pore flow path, $\Delta P/L_e$ is a pressure gradient based on a length of the equivalent pore flow path, μ is viscosity of the fluid, u is a flow velocity of the fluid, $\Delta P/L$ is a pressure gradient based on a length of a porous medium, φ is porosity of the porous medium, L is a length of the porous medium, $L_e$ is a length of the equivalent pore flow path, and T is tortuosity.)

The method may further include calculating friction equivalent permeability (FEP) by using the tortuous hydraulic diameter and the tortuous friction factor-tortuous Reynolds number relationship, after calculating the tortuous friction factor-tortuous Reynolds number relationship.

The FEP may have a relationship defined by an equation shown below.

$$k_{FEP_T} = \frac{2D_{h_T}^2 \cdot \phi T}{f_{v_T} Re_{v_T}}$$

(where $k_{FEP_T}$ is FEP considering tortuosity, v is a flow velocity of a fluid through an equivalent pore flow path, $D_{h_T}$ is a tortuous hydraulic diameter, φ is porosity of a porous medium, T is tortuosity, $f_{v_T}$ is a function of tortuosity and is a tortuous friction factor based on the flow velocity v, and $Re_{v_T}$ is a function of tortuosity and is a tortuous Reynolds number based on the flow velocity v.)

The FEP may have a relationship defined by an equation shown below.

$$k_{FEP_T} = \frac{2D_{h_T}^2}{f_{u_T} Re_{u_T}}$$

(where $k_{FEP_T}$ is FEP considering tortuosity, u is a flow velocity of a fluid, $D_{h_T}$ is a tortuous hydraulic diameter, $f_{u_T}$ is a function of tortuosity and is a tortuous friction factor based on the flow velocity u, and $Re_{u_T}$ is a function of tortuosity and is a tortuous Reynolds number based on the flow velocity u.)

According to another aspect of the present invention, there is provided a method of analyzing flow in a porous medium, the method including calculating a tortuous hydraulic diameter by using porosity, a specific surface area, and tortuosity of a porous medium, calculating a simulation hydraulic diameter by using a shear stress at wall, and comparing the tortuous hydraulic diameter to the simulation hydraulic diameter.

The simulation hydraulic diameter may have a relationship defined by an equation shown below, with the shear stress at wall.

$$D_{CFD} = 4 \tau_w \left(\frac{L}{\Delta P}\right)\left(\frac{\phi v}{u}\right)$$

(where $D_{CFD}$ is a simulation hydraulic diameter, $\tau_w$ is a shear stress at wall, $\Delta P/L$ is a pressure gradient based on a length of a porous medium, φ is porosity of the porous medium, v is a flow velocity of a fluid through an equivalent pore flow path, and u is a flow velocity of the fluid.)

According to another aspect of the present invention, there is provided a method of analyzing flow in a porous medium, the method including calculating a first tortuous hydraulic diameter of a first porous medium, calculating a tortuous friction factor-tortuous Reynolds number relationship by using the first tortuous hydraulic diameter, calculating a second tortuous hydraulic diameter of a second porous medium different from the first porous medium, and calculating permeability of the second porous medium by applying the second tortuous hydraulic diameter to the tortuous friction factor-tortuous Reynolds number relationship calculated using the first tortuous hydraulic diameter.

The calculating of the permeability may be performed using an equation shown below.

$$k_{FEP_T} = \frac{2D_{h_T}^2}{f_{u_T} Re_{u_T}}$$

(where $k_{FEP_T}$ is friction equivalent permeability (FEP) considering tortuosity, u is a flow velocity of a fluid, $D_{h_T}$ is a second tortuous hydraulic diameter, $f_{u_T}$ is a a function of tortuosity and is a tortuous friction factor based on the flow velocity u, and $Re_{u_T}$ is a function of tortuosity and is a tortuous Reynolds number based on the flow velocity u.)

At least one of porosity, a specific surface area, and tortuosity of the second porous medium may differ from that of the first porous medium.

Advantageous Effects

The technical idea of the present invention has been started to propose a generalized permeability estimation method capable of appropriately considering differences and variations in geometric features of porous media and applicable to turbulent flow as well as laminar flow. To this end, a Darcy friction factor-Reynolds number relationship which is commonly used for general internal friction flow analysis, e.g., pipe flow analysis, is extensibly applied to porous flow analysis. Consequentially, a generalized Darcy's friction flow equation applicable to porous flow analysis is proposed by combining theories of prior researchers, e.g., Kozeny's hydraulic diameter and Carman's tortuosity-based average flow velocity. In this procedure, it is found that the concept of tortuosity needs to be supplemented to the Kozeny's hydraulic diameter definition to obtain a stricter porous flow equation. Consequentially, a tortuous hydraulic diameter is newly defined and proposed and a final form of a generalized Darcy's friction flow equation is proposed based on the tortuous hydraulic diameter.

To check effectiveness of the tortuous hydraulic diameter definition proposed in the present invention and to check influence of tortuosity, CFD analysis models mimicking simple hydraulic fractures are configured and DNS flow analysis is performed. As such, it is shown that variations in a pore flow path influence not only tortuosity but also other geometric features, e.g., a specific surface area, and that definition of a hydraulic diameter of a porous medium by reflecting tortuosity is appropriate. Therefore, CFD analysis is additionally performed on hydraulic fracture models having slightly different fracture heights, and hydraulic diameters based on the analysis results are calculated and compared to results calculated based on the two hydraulic diameter definitions. Consequentially, it is shown that the tortuous hydraulic diameter has a very low average error rate of 1.67% and the Kozeny's hydraulic diameter has a relatively large average error rate of 12.8%.

Conclusionally, it is shown that the tortuous hydraulic diameter definition proposed in the present invention may calculate a result very close to an overall CFD analysis result and thus correspond to an equation capable of more strictly defining a hydraulic diameter of a porous medium. Thus, it is shown that porous flow feature variables and equations proposed based on the tortuous hydraulic diameter are also more appropriate and effective.

Ultimately, it is expected that the tortuous hydraulic diameter may contribute to more reliable estimation of feature variables and flow features of porous flow. In addition, the friction factor-based approach method proposed in the present invention may be used to easily and accurately calculate properties such as permeability based on a macroscopic and rheological relationship compared to a conventional approach in a microscopic and geometric point of view. Furthermore, since the proposed equations are based on a friction factor (f·Re) relationship, it is expected that the proposed equations are easily extensible to turbulent flow as well as laminar flow.

The above-described effects are merely examples and the scope of the present invention is not limited thereto.

DESCRIPTION OF THE DRAWINGS

FIG. 1 illustrates a computational fluid dynamics (CFD) simulation model for a method of analyzing flow in a porous medium, according to an embodiment of the present invention.

FIGS. 2A, 2B, 2C, 2D and 2E illustrate models set by varying a fracture height of the model of FIG. 1 in a method of analyzing flow in a porous medium, according to an embodiment of the present invention.

FIGS. 3, 4, 5, 6, 7 and 8 show steady state pressure distributions and streamlines as direct numerical simulation (DNS) results using a base model of FIG. 1 in a method of analyzing flow in a porous medium, according to an embodiment of the present invention.

FIGS. 9 and 10 respectively show a streamline distribution in a +X direction and a streamline distribution in a +Y direction using the base model of FIG. 1 in a method of analyzing flow in a porous medium, according to an embodiment of the present invention.

FIGS. 11 and 12 respectively show a streamline distribution and a proppant shear stress distribution at wall in a +X direction and a streamline distribution and a proppant shear stress distribution at wall in a +Y direction using the base model of FIG. 1 in a method of analyzing flow in a porous medium, according to an embodiment of the present invention.

FIGS. 13 and 14 respectively show a proppant shear stress distribution at wall in a +X direction and a proppant shear stress distribution at wall in a +Y direction using the base model of FIG. 1 in a method of analyzing flow in a porous medium, according to an embodiment of the present invention.

FIGS. 15, 16 and 17 respectively show a streamline distribution in a +X direction, a streamline distribution in a −X direction, and a streamline distribution in a +Y direction as DNS results using a Thick2 model of FIG. 1 in a method of analyzing flow in a porous medium, according to an embodiment of the present invention.

FIGS. 18, 19 and 20 respectively show a streamline distribution in a +X direction, a streamline distribution in a −X direction, and a streamline distribution in a +Y direction as DNS results using a Thick1 model of FIG. 1 in a method of analyzing flow in a porous medium, according to an embodiment of the present invention.

FIGS. 21, 22 and 23 respectively show a streamline distribution in a +X direction, a streamline distribution in a −X direction, and a streamline distribution in a +Y direction as DNS results using a Thin1 model of FIG. 1 in a method of analyzing flow in a porous medium, according to an embodiment of the present invention.

FIGS. 24, 25 and 26 respectively show a streamline distribution in a +X direction, a streamline distribution in a −X direction, and a streamline distribution in a +Y direction as DNS results using a Thin2 model of FIG. 1 in a method of analyzing flow in a porous medium, according to an embodiment of the present invention.

FIGS. 27, 28 and 29 show errors of a Kozeny's hydraulic diameter and a tortuous hydraulic diameter compared to DNS results in a method of analyzing flow in a porous medium, according to an embodiment of the present invention.

FIG. 30 is a flowchart of a method of calculating a tortuous hydraulic diameter of a porous medium, according to an embodiment of the present invention.

FIG. 31 is a flowchart of a method of analyzing flow in a porous medium, according to an embodiment of the present invention.

FIG. 32 is a flowchart of a method of analyzing flow in a porous medium, according to another embodiment of the present invention.

FIG. 33 is a flowchart of a method of analyzing flow in a porous medium, according to another embodiment of the present invention.

MODE OF THE INVENTION

Hereinafter, the present invention will be described in detail by explaining embodiments of the invention with reference to the attached drawings. The invention may, however, be embodied in many different forms and should not be construed as being limited to the embodiments set forth herein; rather, these embodiments are provided so that this disclosure will be thorough and complete, and will fully convey the concept of the invention to one of ordinary skill in the art.

In the present study, characterization of a porous flow feature in combination with a rheological feature in a macroscopic point of view is regarded as being more reasonable and, to this end, grafting of a general internal friction flow theory used for pipe flow analysis or the like is attempted.

That is, instead of individual characterization and combination of a pore flow path, characterization of friction loss of a whole pore flow path network due to various loss elements such as tortuosity, reduction, expansion, and divergence is attempted based on a Darcy friction factor-Reynolds number relationship f·Re in a macroscopic point of view. Such a theoretical approach based on a friction factor relationship is applicable not only to a laminar flow region but also to a turbulent flow region (White, 2001). Like the same f·Re value is maintained for tubes having the same shape and structure, similar feature variables representing similarity may be present in a porous medium such as hydraulic fractures (Cipolla, 2010). This may serve as a critical issue for defining feature variables of porous flow and proposing a correlation therebetween.

As such, the present study systematizes a porous flow equation by adopting an internal friction flow theory, and proposes definition of a dominant feature variable as a more general and practical equation with reference to prior studies of Kozeny and Carman. Ultimately, such an approach proposes a correlation between a geometric factor of a porous medium (e.g., porosity or a specific surface area) and a rheological factor (e.g., a pressure gradient or a flow rate) and is usable not only for permeability estimation but also for various subsequent studies.

Generalization of the Darcy's Friction Flow Equation for Porous Flow Analysis

Various researchers have attempted to adopt the concept of a friction factor in porous flow analysis (Bear, 1975; Neild, 1992). However, the researchers differently define feature variables based on different variable definitions and thus the definitions need to be checked and modified. For example, in some prior studies (Rose, 1945; Carrier, 2003), a Reynolds number of a porous medium is estimated based on a mean grain diameter $d_m$, which is not appropriate in a rheological point of view. It is valid to define a feature variable of porous flow on the consistent basis of a geometric feature and a rheological feature of a pore flow path carrying a fluid in the medium. Examples of such a valid approach includes the Kozeny's definition of a hydraulic diameter of a porous medium and tortuosity-based pressure drop, and Carman's average flow velocity through a pore flow path considering tortuosity, which are commonly used in the field of porous flow analysis (Kozeny, 1927; Carman, 1937, 1938, 1956).

Basically, a hydraulic diameter of a porous medium may be defined based on a geometric relationship between a volume, porosity, and a specific surface area of the medium as shown in Equation 1. Kozeny has adopted the concepts of a grain shape factor $C_s$ and a mean grain diameter $d_m$ and has disclosed the definition of a hydraulic diameter of a porous medium as shown in Equation 2 in 1927 (Kozeny, 1927; Carman, 1938). In this case, when a hydraulic diameter of a porous medium in a rheological point of view may be defined based on Equations 1 and 2, a Reynolds number of porous flow may also be determined. Thus, a flow velocity for determining the Reynolds number needs to be estimated on the basis of a pore flow path like estimation of the hydraulic diameter.

$$D_h = \frac{4\phi}{S_S} \quad \text{[Equation 1]}$$

$$\therefore \phi = \frac{V_p}{V_b} = \frac{S \cdot D_h}{4 \cdot V_b}$$

where $S = \pi D_h \cdot L$ and $S_S = \frac{S}{V_b}$ $$D_h = \frac{4\phi}{S_S} = \frac{4\phi}{S_{SLD}(1-\phi)} = \frac{4 d_m \phi}{C_S(1-\phi)} \quad \text{[Equation 2]}$$

Such a concept has already been considered in a prior study of Kozeny (1927) or Carman (1938). In particular, Carman has disclosed the definition of Equation 3 obtained by adopting the concept of tortuosity T disclosed by Kozeny, in an average fluid velocity u through a porous medium for consideration of an average fluid velocity v through an equivalent pore flow path (Carman, 1938). Consequentially, a Reynolds number of porous flow may be expressed as shown in Equation 4 by adopting the Kozeny's definition of a hydraulic diameter and the Carman's definition of an average fluid velocity through an equivalent pore flow path. To define a friction factor of a porous medium, the Darcy friction factor definition of Equation 5 (White, 2001) which is used for general internal friction flow analysis is adopted. Like the above Reynolds number definition, when the concepts of an average fluid velocity through an equivalent pore flow path and tortuosity are adopted, a friction factor of porous flow may be expressed as shown in Equation 6. In this case, a pressure gradient term to which the concept of tortuosity disclosed by Kozeny is added is used (Carman, 1938).

$$v = \frac{u}{\phi}\left(\frac{L_e}{L}\right) = \frac{u}{\phi T^{\frac{1}{2}}} \quad \text{[Equation 3]}$$

where $T = \left(\frac{L}{L_e}\right)^2$ $$Re_v = \frac{\rho v D_h}{\mu} = \frac{\rho u D_h}{\phi \mu}\left(\frac{L_e}{L}\right) = \frac{Re_v}{\phi T^{\frac{1}{2}}} \quad \text{[Equation 4]}$$

where $Re_u = \frac{\rho u D_h}{\mu}$ $$f \equiv \frac{-8\tau_w}{\rho V^2} \text{ or} \quad \text{[Equation 5]}$$

$$f = -\frac{2D}{\rho V^2}\frac{dP}{dx}$$

where $\epsilon$ is roughness $$f_v = -\left(\frac{2D_h}{\rho v^2}\frac{\Delta P}{L_e}\right) = -\left(\frac{2D_h}{\rho u^2}\frac{\Delta P}{L_e}\right)\phi^2\left(\frac{L}{L_e}\right)^3 \quad \text{[Equation 6]}$$

$$= f_u \phi^2 T^{\frac{3}{2}}$$

where $f_u = -\left(\frac{2D_h}{\rho u^2}\frac{\Delta P}{L}\right)$

Equation 7 may be obtained by multiplying the above-calculated Reynolds number by the friction factor. When Equation 7 is expressed for the average fluid velocity u, i.e., an apparent flow velocity, through the porous medium, a friction flow equation of the porous medium of Equation 8 may be obtained. Through comparison with the Darcy equation, Equation 8 may be modified into a permeability equation of Equation 9. Herein, Equation 9 is called a friction equivalent permeability (FEP) equation distinguishably from other permeability equations. Equation 8(a) and Equation 9(a) correspond to microscopic definitions on the basis of an equivalent pore flow path, and Equation 8(b) and Equation 9(b) correspond to macroscopic definitions on the basis of medium flow. Consequentially, it is shown that Equation 8(b) has the same form as the Darcy's friction flow equation (the Darcy-Weisbach equation) used for general internal friction flow analysis. This shows that, by appropriately defining the hydraulic diameter, the Reynolds number, and the friction factor of the porous medium, porous flow may be represented as an internal friction flow equation for an equivalent pore flow path. Thus, Equation 8(b) may be regarded as a the Darcy's friction flow equation generalized to be extensible to porous flow analysis. Equation 9(b) may be regarded as a general theoretical permeability equation based on an equivalent flow path disclosed in prior studies (Burmeister, 1993; Kaviany, 1952; Muskat, 1945).

$$f_v Re_v = -\left(\frac{2D_h}{\rho v^2}\frac{\Delta P}{L_e}\right)\left(\frac{\rho v D_h}{\mu}\right) = -\left(\frac{2D_h^2}{\mu \cdot u}\frac{\Delta P}{L}\right)\phi\left(\frac{L}{L_e}\right)^2 \quad \text{[Equation 7]}$$

$$= f_u Re_u \cdot \phi T$$

$$u = -\frac{2D_h^2 \cdot \phi T}{\mu \cdot f_v Re_v}\frac{\Delta P}{L} \text{ or} \quad \text{(a)} \quad \text{[Equation 8]}$$

$$u = -\frac{2D_h^2}{\mu \cdot f_u Re_u}\frac{\Delta P}{L} \quad \text{(b)}$$

$$k_{FEP} = \frac{2D_h^2 \cdot \phi T}{f_v Re_v} \quad \text{or} \quad \text{(a)} \qquad [\text{Equation 9}]$$

$$k_{FEP} = \frac{2D_h^2}{f_u Re_u} \quad \text{(b)}$$

In the above procedure, the porous flow equations of Equations 8 and 9 have been provided by adopting the Darcy friction factor commonly used for general internal flow analysis. Validities of physical concept and mathematical development of such an approach have been verified in the above description, and attempts have been made to additionally verify effectiveness thereof. To this end, comparison with the most basic equation among porous flow analysis equations, i.e., the Kozeny-Carman equation, has been made (Bear, 1975; Carrier, 2003). Equation 10 is a result expressed by adopting the Kozeny's hydraulic diameter definition of Equation 2 in the permeability definition based on the Kozeny-Carman equation, setting an equivalent cross-sectional shape factor $C_1$ to be '2' on the assumption of a cylindrical shape, setting a grain shape factor $C_S$ to be '6' on the basis of completely spherical medium grains, and substituting a relationship of $T=(2/\pi)^2$ by adopting tortuosity assumption of Hitchcock (Carman, 1938). For reference, this equation was used as a theoretical basis of a plurality of different prior studies of Ergun, etc. Although some factors or exponents of Equation 10 have been modified in some cases (Bear, 1975; Nield, 1992), Equation 10 is fundamentally based on the Kozeny-Carman equation. When expressed by substituting the same values used in Equation 10 by Carman, in Equation 9(a) provided on the basis of an average velocity of a pore flow path of a porous medium, Equation 11 may be obtained. However, since the equivalent pore flow path of Equation 9(a) is based on a cylindrical microtube and the Kozeny-Carman equation is aimed for laminar flow, the $f_v \cdot Re_v$ value in this case was set to '64' (White, 2001). Consequentially, it is shown that Equation 11 discloses the same relationship as Equation 10 corresponding to the Kozeny-Carman equation. As such, it may be shown again that the FEP equation of Equation 9 disclosed in the present study is an equation including the Kozeny-Carman equation and generally representing a permeability relationship of a porous medium. Furthermore, it may also be shown again that the approaches and the equations disclosed in the present study are effective.

$$k_{K-C} = \left(\frac{\phi D_h^2 T}{16 \, C_1}\right) = \left(\frac{1}{180}\right)\left(\frac{d_m^2 \cdot \phi^3}{(1-\phi)^2}\right) \qquad [\text{Equation 10}]$$

where $C_1 \approx 2$, $C_S = 6$, $T = \left(\frac{2}{\pi}\right)^2 \approx \frac{1}{2.5}$ $$k_{FEP} = \frac{2D_h^2 \cdot \phi T}{f_v Re_v} = \left(\frac{32}{f_v Re_v}\right)\left(\frac{d_m^2 \cdot \phi^3}{C_S^2(1-\phi)^2}\right)\left(\frac{2}{\pi}\right)^2 \qquad [\text{Equation 11}]$$

$$= \left(\frac{1}{180}\right)\left(\frac{d_m^2 \cdot \phi^3}{(1-\phi)^2}\right) \text{ at } f_v Re_v = 64$$

Modification of Kozeny's Hydraulic Diameter Definition, by Using Tortuosity

The Darcy's friction flow equation and the FEP equation generalized to be extensible to porous flow analysis by adopting the concepts of a hydraulic diameter and tortuosity of a porous medium have been described in the previous section. It may be easily shown that the hydraulic diameter of the porous medium is a dominant feature variable for a porous flow feature not only in these equation but also the Kozeny-Carman equation, etc. Herein, the Kozeny's hydraulic diameter definition is representative definition of a hydraulic diameter of a porous medium, which is used up to now after the disclosure of Kozeny in 1927 (Carman, 1938). However, this definition strictly defines a geometric relationship of the porous medium but is regarded as not being capable of appropriately reflecting a rheological feature of the porous flow. For example, general conduits such as cylindrical pipes or rectangular ducts have fixed cross-sectional shapes or flow paths, and thus a hydraulic diameter thereof may be defined considering only a geometric element of the conduit. However, porous media having the same geometric conditions, e.g., surface area and porosity, may have different pore flow paths and flow conditions depending on structures or sorts of grains. Thus, a hydraulic diameter of a porous medium should be defined considering not only a geometric feature of medium grains but also a flow dependent geometric feature, e.g., tortuosity of a pore flow path.

In this point of view, Kozeny (1927) has initially argued that influence of tortuosity should be considered for porous flow analysis and has disclosed a flow equation modified by applying the concept of tortuosity to a pressure gradient term. Thereafter, Carman (1938) has argued that tortuosity should be applied not only to a pressure gradient term but also to a flow velocity term, and has disclosed the Kozeny-Carman equation. As described above, when tortuosity of a flow path influences a pressure gradient term and a flow velocity term in porous flow analysis, tortuosity should be correlated with another dominant feature variable for a friction flow feature, i.e., a hydraulic diameter. As such, the present study has checked influence of tortuosity of a flow path on the hydraulic diameter definition. Equation 1 corresponds to the basic definition of a hydraulic diameter of a porous medium and is an equation representing a correlation between porosity and a specific surface area. Herein, the specific surface area directly influencing the hydraulic diameter is a flow dependent geometric variable which varies depending on tortuosity of a pore flow path. Thus, when a porous flow velocity and a pressure drop are correlated with tortuosity, the hydraulic diameter may be expressed as shown in Equation 12, considering variations in the specific surface area depending on the tortuosity. Consequentially, the hydraulic diameter of the porous medium has been modified to include tortuosity of a flow path as shown in Equation 13. In the present study, the modified hydraulic diameter defined as shown in Equation 13 is called a tortuous hydraulic diameter to be distinguished from other hydraulic diameter definitions.

$$D_{h_T} = \frac{4\,\phi}{S_{S_T}} = \left(\frac{4\,\phi \cdot V_b}{\pi D_{h_T} \cdot L}\right) \cdot \left(\frac{L}{L_e}\right) = \left(\frac{4\,\phi \cdot V_b}{\pi D_h \cdot L}\right) \cdot \left(\frac{L}{L_e}\right) \cdot \left(\frac{D_h}{D_{h_T}}\right) \qquad [\text{Equation 12}]$$

$$= \left(\frac{D_h^2}{D_{h_T}}\right) \cdot \left(\frac{L}{L_e}\right)$$

where $S_{S_T} = \frac{S_T}{V_b}$ and $S_T = \pi D_{h_T} \cdot L_e = \pi D_{h_T} \cdot L \cdot \left(\frac{L_e}{L}\right)$ $$D_{h_T} = D_h \cdot T^{\frac{1}{4}} \quad \text{or} \qquad [\text{Equation 13}]$$

$$D_{h_T} = \frac{4\,\phi}{S_{S_T}} = \left(\frac{4\,\phi}{S_S}\right) \cdot \left(\frac{L}{L_e}\right)^{1/2}$$

As the definition of the hydraulic diameter of the porous medium is modified into the tortuous hydraulic diameter definition shown in Equation 13, the generalized Darcy's friction flow equation and the FEP equation described in the previous section need to be modified based on the tortuous hydraulic diameter definition. A Reynolds number and a friction factor of the porous medium, which are modified based on the tortuous hydraulic diameter, are respectively shown in Equations 14 and 15, and a product thereof may be expressed as shown in Equation 16. Consequentially, final forms of the generalized Darcy's friction flow equation and the FEP equation proposed based on the tortuous hydraulic diameter definition of the present study are respectively shown in Equations 17 and 18.

$$Re_{v_T} = \frac{\rho v D_{h_T}}{\mu} = \frac{\rho u D_{h_T}}{\phi \mu}\left(\frac{L_e}{L}\right) = Re_{u_T}\phi^{-1}T^{-\frac{1}{2}}$$
$$= Re_u \phi^{-1} T^{-\frac{1}{4}}$$
$$\text{where } Re_{u_T} = \frac{\rho u D_{h_T}}{\mu} = Re_u \cdot T^{\frac{1}{4}}$$
[Equation 14]

$$f_{v_T} = -\left(\frac{2D_{h_T}}{\rho v^2}\frac{\Delta P}{L_e}\right) = -\left(\frac{2D_{h_T}}{\rho u^2}\frac{\Delta P}{L_e}\right)\phi^2\left(\frac{L}{L_e}\right)^3$$
$$= f_{u_T}\phi^2 T^{\frac{3}{2}}$$
$$= f_u \phi^2 T^{\frac{7}{4}}$$
$$\text{where } f_{u_T} = -\left(\frac{2D_{h_T}}{\rho u^2}\frac{\Delta P}{L}\right) = -\left(\frac{2D_h}{\rho u^2}\frac{\Delta P}{L}\right)\left(\frac{L}{L_e}\right)$$
$$= f_u \cdot T^{\frac{1}{4}}$$
[Equation 15]

$$f_{v_T}Re_{v_T} = -\left(\frac{2D_{h_T}}{\rho v^2}\frac{\Delta P}{L_e}\right)\left(\frac{\rho v D_{h_T}}{\mu}\right) = -\left(\frac{2D_{h_T}^2}{\mu \cdot u}\frac{\Delta P}{L}\right)\phi\left(\frac{L}{L_e}\right)^2$$
$$= f_{u_T}Re_{u_T}\cdot \phi T$$
[Equation 16]

$$u = -\frac{2D_{h_T}^2 \cdot \phi T}{\mu \cdot f_{v_T}Re_{v_T}}\frac{\Delta P}{L} \quad \text{or} \quad (a)$$
$$u = -\frac{2D_{h_T}^2}{\mu \cdot f_{u_T}Re_{u_T}}\frac{\Delta P}{L} \quad (b)$$
[Equation 17]

$$k_{FEP_T} = \frac{2D_{h_T}^2 \cdot \phi T}{f_{v_T}Re_{v_T}} \quad \text{or} \quad (a)$$
$$k_{FEP_T} = \frac{2D_{h_T}^2}{f_{u_T}Re_{u_T}} \quad (b)$$
[Equation 18]

Herein, although Equations 17 and 18 are based on the new hydraulic diameter definition, since both of denominators and numerators of these equations include the square of a hydraulic diameter, a flow relationship and permeability based on Equations 17 and 18 obtain the same results as Equations 8 and 9 based on the Kozeny's hydraulic diameter. That is, in a point of view of permeability estimation, Equations 9 and 18 are based on different hydraulic diameter definitions but will estimate the same permeability value. However, hydraulic diameters and f·Re relationships included in different equations have different values and only one of the two types of definitions is a definition capable of appropriately representing a porous flow feature. As such, in the present study, computational fluid dynamics (Computational Fluid Dynamics, CFD) analysis is adopted to verify appropriateness of the two hydraulic diameter definitions and the Darcy's friction flow equations based thereon.

Computational Fluid Dynamics (CFD) Simulation

CFD simulation results of simple hydraulic fracture models filled with spherical beads will now be described.

In this section, to verify appropriateness of the previously described tortuous hydraulic diameter definition and a loss feature of porous flow, a CFD analysis model mimicking hydraulic fractures was prepared in a simple plate shape filled with a proppant, and direct numerical simulation (DNS) analysis was performed.

FIG. 1 illustrates a CFD simulation model for a method of analyzing flow in a porous medium, according to an embodiment of the present invention.

Referring to FIG. 1, a micro parallel plate having a width×depth×height of 2 mm×2 mm×0.1 mm was prepared as an analysis model assuming simple fractures, and 390 spherical beads having a diameter of 0.098 mm were distributed between horizontal fractures as a mimicked proppant of the hydraulic fractures. In this case, the proppant beads were distributed to alternate with each other as shown in FIG. 1 to have a different grain distribution feature depending on a direction of flow. That is, the fracture model of FIG. 1 is the same porous medium but will show different flow loss features due to different proppant structure features and inlet/outlet conditions in different directions of flow, e.g., +X, −X, and +Y directions.

FIG. 2 illustrates models set by varying a fracture height of the model of FIG. 1 in a method of analyzing flow in a porous medium, according to an embodiment of the present invention.

Referring to FIG. 2, a model (C) was defined as a base model having a fracture height (or aperture) of 0.1 mm and a porosity of 52%, and a Thick1 model (B) and a Thick2 model (A) were respectively defined as models obtained by increasing the fracture height by 0.004 mm and 0.008 mm to 0.104 mm and 0.108 mm. On the contrary, a Thin1 model (D) and a Thin2 model (E) were respectively defined as models obtained by reducing the fracture height by 0.004 mm and 0.008 mm to 0.096 mm and 0.092 mm.

In summary, using a total of five models having slightly different fracture heights, DNS flow analysis was performed for a total of 15 cases by assuming that all analysis conditions other than the condition of three different directions of flow are the same. A target fluid was assumed as a methane gas because the present study is focused on a shale gas reservoir, and a density and viscosity thereof were respectively set to be 0.6679 kg/m$^3$ and 0.00001087 kg/ms. The surfaces of the proppant and the plates were assumed as being completely smooth and isothermal, and the same average flow velocity u of 0.082 m/s through the medium in a direction perpendicular to an inlet cross-section was set for every analysis. The CFD modeling and analysis were performed in a steady state based on Ansys-Fluent commercial CFD simulation software (Ansys Co. U.S.), and a criterion for steady state convergence was set as a case in which all residuals of a continuity equation and directional momentum equations reach an order of 10$^{-8}$. The DNS analysis method was adopted due to the micrometer scale size of the analysis models, and an average number of tetrahedral unstructured grids of the analysis models is about 4,000,000. A 2$^{nd}$ order upwind scheme was applied for spatial discretization, and a SIMPLE method was used as a pressure-velocity coupling scheme.

FIGS. 3 to 8 show steady state pressure distributions and streamlines as DNS results using the base model of FIG. 1 in a method of analyzing flow in a porous medium, according to an embodiment of the present invention.

FIG. 3 shows a steady state pressure distribution in a +X direction, FIG. 4 shows streamlines in the +X direction, FIG. 5 shows a steady state pressure distribution in a −X direction, FIG. 6 shows streamlines in the −X direction, FIG. 7 shows a steady state pressure distribution in a +Y direction, and FIG. 8 shows streamlines in the +Y direction.

Referring to FIGS. 3 to 8, as analysis results obtained by varying only the direction of flow through the same porous medium, it is shown that the pressure distributions are generally similar but flow velocities and pressure drops greatly differ in the +X, −X, and +Y directions of flow. That is, the +Y direction flow analysis results of FIGS. 7 and 8 show a much less pressure drop and a lower velocity distribution compared to the results of FIGS. 3 to 6 even at the same flow rate through the same medium. In terms of streamline distributions, the results of FIGS. 3 to 6 corresponding to grain structures similar to directions of flow show similar forms but the results of FIGS. 7 and 8 corresponding to a different direction of flow, i.e., the +Y direction, show a great difference not only in flow velocity but also in a tortuous feature of a flow path, i.e., a pore flow path. This is a representative example showing the above-described flow dependent geometric feature indicating that a flow feature differs depending on a flow condition through the same medium. Thus, to investigate a porous flow feature, not only a geometric feature but also a rheological feature of a medium need to be considered together. Additionally, in the streamline distribution of FIG. 8, it needs to be noted that regions between grains aligned in parallel to the direction of flow are hardly used as a flow path.

FIGS. 9 and 10 respectively show a streamline distribution in the +X direction and a streamline distribution in the +Y direction using the base model of FIG. 1 in a method of analyzing flow in a porous medium, according to an embodiment of the present invention.

FIGS. 11 and 12 respectively show a streamline distribution and a proppant shear stress distribution at wall in the +X direction and a streamline distribution and a proppant shear stress distribution at wall in the +Y direction using the base model of FIG. 1 in a method of analyzing flow in a porous medium, according to an embodiment of the present invention.

FIGS. 13 and 14 respectively show a proppant shear stress distribution at wall in the +X direction and a proppant shear stress distribution at wall in the +Y direction using the base model of FIG. 1 in a method of analyzing flow in a porous medium, according to an embodiment of the present invention.

Referring to FIGS. 9 to 14, the streamline distributions are shown in a magnified manner and the above-described flow velocity features due to a flow path are clearly shown. In FIGS. 9 and 10, in different directions of flow, e.g., the +X and +Y directions, different tortuous features of flow paths are shown based on different grain structures. Additionally, in FIG. 11, it is shown that, in terms of the proppant shear stress distribution at wall, a specific surface area of +Y direction flow in contact with main flow is much less than that of +X direction flow.

Basically, friction loss of flow is directly correlated with a specific surface area of a tube for transferring a shear stress at wall (White, 2001; Chalky, 1949). Therefore, a difference in tortuosity depending on a direction of flow will be closely correlated not only with differences in flow velocity and pressure drop but also with a specific surface area for transferring frictional resistance to porous flow. This shows validity of the logic of Kozeny and Carman considering tortuosity for a pressure drop and a flow velocity of a porous flow path, and means that variations in the pore flow path influence not only variations in the tortuosity but also other geometric features related to the tortuosity, e.g., a specific surface area. A specific surface area of a porous medium in a geometric point of view is a fixed constant value, and the Kozeny's hydraulic diameter definition is also based on such a relationship. However, unlike a tube having a fixed shape, e.g., a general pipe or duct, a pore flow path of a porous medium forms a different flow path and shows a unique flow feature depending on, for example, a geometric feature and a structure of internal grains even under the same geometric condition as shown in FIGS. 3 to 14. The influence thereof on a pressure drop and a flow velocity has been reflected on the above-described studies of Kozeny and Carman, but the influence on and correlation with a hydraulic diameter have not been checked until now.

FIGS. 15 to 17 respectively show a streamline distribution in the +X direction, a streamline distribution in the −X direction, and a streamline distribution in the +Y direction as DNS results using the Thick2 model of FIG. 1 in a method of analyzing flow in a porous medium, according to an embodiment of the present invention.

FIGS. 18 to 20 respectively show a streamline distribution in the +X direction, a streamline distribution in the −X direction, and a streamline distribution in the +Y direction as DNS results using the Thick1 model of FIG. 1 in a method of analyzing flow in a porous medium, according to an embodiment of the present invention.

FIGS. 21 to 23 respectively show a streamline distribution in the +X direction, a streamline distribution in the −X direction, and a streamline distribution in the +Y direction as DNS results using the Thin1 model of FIG. 1 in a method of analyzing flow in a porous medium, according to an embodiment of the present invention.

FIGS. 24 to 26 respectively show a streamline distribution in the +X direction, a streamline distribution in the −X direction, and a streamline distribution in the +Y direction as DNS results using the Thin2 model of FIG. 1 in a method of analyzing flow in a porous medium, according to an embodiment of the present invention.

To this end, in the present study, in addition to the base model analysis of FIGS. 3 to 8, four types of analysis models having different fracture heights were set as indicated by (A), (B), (D), and (E) of FIG. 2, and DNS flow analysis was performed in the same manner. FIGS. 15 to 26 show streamline distributions in 12 cases in which the four additionally set models (vertical) are under the three flow direction conditions (horizontal). It is shown that the streamline distributions (A), (B), and (C) in the different directions of flow hardly have structural variations of flow paths based on the fracture aperture variations but are similarly maintained. However, it is shown that the width of the flow path varies in proportion to the fracture height. The variation in the width of the flow path may influence not only the size but also the shape of a flow cross-section for determining a hydraulic diameter and thus may be regarded as a dominant factor for a feature of flow loss.

The previously described equations are adopted again to estimate hydraulic diameters of a total of 15 CFD analysis models used in the present study and to compare them to the two types of definitions. Equation 19 may be obtained by combining the Darcy friction factor definition shown in Equation 5, and the Darcy-Weisbach equation, and applying a tortuosity-flow velocity-pressure gradient relationship disclosed by Kozeny and Carman. When Equation 19 is modified with respect to a hydraulic diameter, Equation 20 is obtained. Consequentially, a hydraulic diameter $D_{CFD}$ of each analysis model base on a physical quantity calculated using CFD analysis may be estimated using Equation 20. Therefore, one of the tortuous hydraulic diameter definition and the Kozeny's hydraulic diameter definition, which achieves a result closer to the hydraulic diameter $D_{CFD}$ calculated using CFD analysis, may be determined as a stricter porous medium hydraulic diameter definition.

$$\tau_w = \left(\frac{D_{CFD}}{4}\right)\left(\frac{\Delta P}{L_e}\right) = \left(\frac{D_{CFD}}{4}\right)\left(\frac{\Delta P}{L}\right)\left(\frac{u}{\phi v}\right) \quad \text{[Equation 19]}$$

where $v = \frac{u}{\phi}\left(\frac{L_e}{L}\right)$ $$D_{CFD} = 4\tau_w\left(\frac{L}{\Delta P}\right)\left(\frac{\phi v}{u}\right) \quad \text{[Equation 20]}$$

DNS analysis results of the five fracture models having different fracture apertures, which are considered in the present study, are shown in Tables 1, 2, and 3 based on directions of flow. Results calculated based on the Kozeny's hydraulic diameter (Kozeny's $D_h$) definition and the tortuous hydraulic diameter ($D_{hT}$) definition are shown in the last two columns of each table. Herein, numbers in brackets denote errors between hydraulic diameters calculated using CFD analysis and hydraulic diameters calculated based on the two definitions, and error range distributions based on directions of flow are shown in FIGS. 27 to 29.

In the following tables, units are as described below:
v [m/s], ΔP [pa], $\tau_w$ [Pa], D [m], $S_s$ [m$^{-2}$].

In the following tables, terms are as described below:

"v" is an average flow velocity of a streamline flowing through each fracture model. Herein, an average pore flow velocity u is set to be 0.082 m/s for all fracture models.

"ΔP" is a pressure gradient between an inlet surface and an outlet surface of each fracture model.

"$\tau_w$" is an average shear stress at wall of each fracture model.

"$S_s$" is a specific surface area calculated based on a ratio between a whole surface area and a bulk volume of a solidus part of each fracture model.

"T" is tortuosity of each fracture model, which is calculated based on a relationship of $$v = \frac{u}{\phi}\left(\frac{L_e}{L}\right) = \frac{u}{\phi T^{1/2}}.$$

Table 1 is a table comparing the Kozeny's hydraulic diameter and the tortuous hydraulic diameter based on the DNS results using the models for the +X direction flow.

TABLE 1

| +X | φ | v | ΔP | $\tau_w$ | $D_{CFD}$ | $S_S$ | T | Kozeny's $D_h$ | $D_{hT}$ |
|---|---|---|---|---|---|---|---|---|---|
| (A) Thick2 | 55.51% | 0.18423 | 96.200 | 0.40641 | 4.21E−05 | 46756.999 | 0.80367 | 4.75E−05 (12.92%) | 4.26E−05 (1.23%) |
| (B) Thick1 | 53.80% | 0.19544 | 113.164 | 0.43362 | 3.92E−05 | 48516.884 | 0.78166 | 4.44E−05 (13.10%) | 3.92E−05 (0.00%) |
| (C) Base | 51.95% | 0.20683 | 133.713 | 0.46409 | 3.63E−05 | 50417.559 | 0.76487 | 4.12E−05 (13.54%) | 3.60E−05 − (0.70%) |
| (D) Thin1 | 49.98% | 0.21345 | 159.653 | 0.50502 | 3.28E−05 | 51851.251 | 0.77038 | 3.86E−05 (17.38%) | 3.38E−05 (3.02%) |
| (E) Thin2 | 48.06% | 0.23313 | 189.448 | 0.55763 | 3.21E−05 | 52757.048 | 0.73355 | 3.64E−05 (13.51%) | 3.12E−05 − (2.78%) |

Table 2 is a table comparing the Kozeny's hydraulic diameter and the tortuous hydraulic diameter based on the DNS results using the models for the −X direction flow.

TABLE 2

| −X | φ | v | ΔP | $\tau_w$ | $D_{CFD}$ | $S_S$ | T | Kozeny's $D_h$ | $D_{hT}$ |
|---|---|---|---|---|---|---|---|---|---|
| (A) Thick2 | 55.51% | 0.18341 | 96.025 | 0.40641 | 4.19E−05 | 46756.999 | 0.80726 | 4.75E−05 (13.22%) | 4.27E−05 (1.73%) |
| (B) Thick1 | 53.80% | 0.19388 | 112.950 | 0.43289 | 3.89E−05 | 48516.884 | 0.78797 | 4.44E−05 (13.99%) | 3.94E−05 (1.19%) |
| (C) Base | 51.95% | 0.20680 | 133.460 | 0.46323 | 3.63E−05 | 50417.559 | 0.76501 | 4.12E−05 (13.55%) | 3.61E−05 − (0.68%) |
| (D) Thin1 | 49.98% | 0.21345 | 159.192 | 0.50502 | 3.29E−05 | 51851.251 | 0.77041 | 3.86E−05 (17.04%) | 3.38E−05 (2.73%) |
| (E) Thin2 | 48.06% | 0.23030 | 188.916 | 0.55763 | 3.18E−05 | 52757.048 | 0.74630 | 3.64E−05 (15.16%) | 3.14E−05 − (1.26%) |

Table 3 s a table comparing the Kozeny's hydraulic diameter and the tortuous hydraulic diameter based on the DNS results using the models for the +Y direction flow.

TABLE 3

| -X | φ | v | ΔP | $\tau_w$ | $D_{CFD}$ | $S_S$ | T | Kozeny's $D_h$ | $D_{hT}$ |
|---|---|---|---|---|---|---|---|---|---|
| (A) Thick2 | 55.51% | 0.16891 | 70.941 | 0.33422 | 4.30E−05 | 46756.999 | 0.87564 | 4.75E−05 (10.44%) | 4.45E−05 (3.40%) |
| (B) Thick1 | 53.80% | 0.17733 | 80.371 | 0.34865 | 4.03E−05 | 48516.884 | 0.86149 | 4.44E−05 (10.11%) | 4.12E−05 (2.20%) |
| (C) Base | 51.95% | 0.18754 | 90.974 | 0.36523 | 3.81E−05 | 50417.559 | 0.84357 | 4.12E−05 (8.26%) | 3.79E−05 − (0.57%) |
| (D) Thin1 | 49.98% | 0.18775 | 104.556 | 0.39696 | 3.47E−05 | 51851.251 | 0.87587 | 3.86E−05 (11.19%) | 3.61E−05 (4.06%) |
| (E) Thin2 | 48.06% | 0.20161 | 116.936 | 0.41694 | 3.36E−05 | 52757.048 | 0.85102 | 3.64E−05 (8.72%) | 3.36E−05 − (0.04%) |

FIGS. 27 to 29 show errors of the Kozeny's hydraulic diameter and the tortuous hydraulic diameter compared to the DNS results in a method of analyzing flow in a porous medium, according to an embodiment of the present invention.

Referring to FIGS. 27 to 29, consequentially, it is shown that the tortuous hydraulic diameter (indicated by "THD") has a very low average error rate of 1.67% and the Kozeny's hydraulic diameter has a relatively large average error rate of 12.8%. Conclusionally, it is shown that the tortuous hydraulic diameter definition proposed in the present study may calculate a result very close to an overall CFD analysis result and thus correspond to an equation capable of more strictly defining a hydraulic diameter of a porous medium. Thus, it is valid to define a feature variable of porous flow, e.g., a friction factor or a Reynolds number of porous flow, based on a tortuous hydraulic diameter, and it is appropriate to estimate a porous flow feature such as a threshold Reynolds number based on the definition.

Finally, to check influence of each hydraulic diameter definition on the feature variable, a friction factor and a f·Re relationship of the five fracture models considered in the present study are shown in Tables 4, 5, and 6 based on the directions of flow. In this case, results calculated based on the Kozeny's hydraulic diameter (Kozeny's $D_h$) definition and the tortuous hydraulic diameter ($D_{hT}$) definition are distinguishably shown in the tables.

Table 4 is a table comparing the friction factor and the f·Re value based on the Kozeny's hydraulic diameter and the tortuous hydraulic diameter of the +X direction flow.

TABLE 4

| +X | φ | k [D] | Kozeny's $D_h$ | $f_u$ | $f_u Re_u$ | $D_{hT}$ | $f_{uT}$ | $f_{uT} Re_{uT}$ |
|---|---|---|---|---|---|---|---|---|
| (A) Thick2 | 55.51% | 30.575 | 4.75E−05 | 552.09 | 147.51 | 4.26E−05 | 494.93 | 118.55 |
| (B) Thick1 | 53.80% | 25.992 | 4.44E−05 | 606.60 | 151.38 | 3.92E−05 | 536.30 | 118.33 |
| (C) Base | 51.95% | 21.997 | 4.12E−05 | 666.03 | 154.46 | 3.60E−05 | 582.49 | 118.14 |
| (D) Thin1 | 49.98% | 18.423 | 3.86E−05 | 743.92 | 161.38 | 3.38E−05 | 652.95 | 124.33 |
| (E) Thin2 | 48.06% | 15.526 | 3.64E−05 | 834.27 | 171.05 | 3.12E−05 | 714.53 | 125.47 |

Table 5 is a table comparing the friction factor and the f·Re value based on the Kozeny's hydraulic diameter and the tortuous hydraulic diameter of the −X direction flow.

TABLE 5

| +X | φ | k [D] | Kozeny's $D_h$ | $f_u$ | $f_u Re_u$ | $D_{hT}$ | $f_{uT}$ | $f_{uT} Re_{uT}$ |
|---|---|---|---|---|---|---|---|---|
| (A) Thick2 | 55.51% | 30.631 | 4.75E−05 | 551.09 | 147.25 | 4.27E−05 | 495.14 | 118.87 |
| (B) Thick1 | 53.80% | 26.041 | 4.44E−05 | 605.45 | 151.10 | 3.94E−05 | 537.44 | 119.06 |
| (C) Base | 51.95% | 22.039 | 4.12E−05 | 664.77 | 154.16 | 3.61E−05 | 581.44 | 117.94 |
| (D) Thin1 | 49.98% | 18.477 | 3.86E−05 | 741.77 | 160.92 | 3.38E−05 | 651.07 | 123.97 |
| (E) Thin2 | 48.06% | 15.570 | 3.64E−05 | 831.93 | 170.57 | 3.14E−05 | 716.88 | 126.65 |

Table 6 is a table comparing the friction factor and the f·Re value based on the Kozeny's hydraulic diameter and the tortuous hydraulic diameter of the +Y direction flow.

TABLE 6

| +X | φ | k [D] | Kozeny's $D_h$ | $f_u$ | $f_u Re_u$ | $D_{hT}$ | $f_{uT}$ | $f_{uT} Re_{uT}$ |
|---|---|---|---|---|---|---|---|---|
| (A) Thick2 | 55.51% | 41.462 | 4.75E−05 | 407.13 | 108.78 | 4.45E−05 | 381.17 | 95.35 |
| (B) Thick1 | 53.80% | 36.597 | 4.44E−05 | 430.82 | 107.52 | 4.12E−05 | 399.87 | 92.62 |
| (C) Base | 51.95% | 32.332 | 4.12E−05 | 453.15 | 105.09 | 3.79E−05 | 416.20 | 88.65 |

TABLE 6-continued

| +X | φ | k [D] | Kozeny's $D_h$ | $f_u$ | $f_u Re_u$ | $D_{hT}$ | $f_{uT}$ | $f_{uT} Re_{uT}$ |
|---|---|---|---|---|---|---|---|---|
| (D) Thin1 | 49.98% | 28.132 | 3.86E-05 | 487.19 | 105.69 | 3.61E-05 | 455.95 | 92.57 |
| (E) Thin2 | 48.06% | 25.153 | 3.64E-05 | 514.95 | 105.58 | 3.36E-05 | 474.26 | 89.55 |

Referring to Tables 4 and 5, it is shown that the +X and −X direction flows are represented as two f·Re values of about 118 (the cases of (A), (B), and (C)) and about 125 (the cases of (D) and (E)). It is regarded that this is because of a slight difference in a flow path shape between a case when the proppant is in contact with the fracture surfaces (the cases of (D) and (E)) and a case when the proppant is not in contact with the fracture surfaces (the cases of (A), (B), and (C)). Consequentially, based on the tortuous hydraulic diameter, it is shown that the f·Re relationship of a specific medium is represented as a specific constant. On the contrary, based on the Kozeny's hydraulic diameter, f·Re similarity is not observed and the f·Re value is continuously changed in one direction.

Referring to Table 6, in the +Y direction flow, f·Re similarity is well maintained based on the Kozeny's hydraulic diameter. It is regarded that this is because the +Y direction flow has a low tortuosity and has a flow path feature similar to that of general pipe flow. However, the general porous flow has a much complicated flow path structure and a large tortuosity and thus has f·Re similarity based on the tortuous hydraulic diameter like the +X and −X direction flows. Ultimately, since a f·Re value measured form a medium having a specific porosity (fracture aperture) may be equally used for homogeneous media and only a hydraulic diameter of a medium having a different porosity (fracture aperture) value may be newly calculated as shown in Equation 21 to estimate permeability, f·Re similarity may serve as a very practical scheme.

$$k_{FEP_T} = \frac{2D_{h_T}^2}{f_{u_T} Re_{u_T}}$$ [Equation 21]

where $f_{u_T} Re_{u_T} \approx (f_{u_T} Re_{u_T})_{Base}$

CONCLUSION

The present study has been started to propose a generalized permeability estimation method capable of appropriately considering variations in geometric features of porous media and applicable to turbulent flow as well as laminar flow. To this end, a Darcy friction factor-Reynolds number relationship which is commonly used for general internal friction flow analysis, e.g., pipe flow analysis, is extensibly applied to porous flow analysis. Consequentially, a generalized Darcy's friction flow equation applicable to porous flow analysis is proposed by combining theories of prior researchers, e.g., Kozeny's hydraulic diameter and Carman's tortuosity-based average flow velocity. In this procedure, it is found that the concept of tortuosity needs to be supplemented to the Kozeny's hydraulic diameter definition to obtain a stricter porous flow equation. Consequentially, a tortuous hydraulic diameter is newly defined and proposed and a final form of a generalized Darcy's friction flow equation is proposed based on the tortuous hydraulic diameter.

To check effectiveness of the tortuous hydraulic diameter definition proposed in the present study and to check influence of tortuosity, CFD analysis models mimicking simple hydraulic fractures are configured and DNS flow analysis is performed. As such, it is shown that variations in a pore flow path influence not only tortuosity but also other geometric features, e.g., a specific surface area, and that definition of a hydraulic diameter of a porous medium by reflecting tortuosity is appropriate. Therefore, CFD analysis is additionally performed on hydraulic fracture models having slightly different fracture heights, and hydraulic diameters based on the analysis results are calculated and compared to results calculated based on the two hydraulic diameter definitions. Consequentially, it is shown that the tortuous hydraulic diameter has a very low average error rate of 1.67% and the Kozeny's hydraulic diameter has a relatively large average error rate of 12.8%. Conclusionally, it is shown that the tortuous hydraulic diameter definition proposed in the present study may calculate a result very close to an overall CFD analysis result and thus correspond to an equation capable of more strictly defining a hydraulic diameter of a porous medium. Thus, it is shown that porous flow feature variables and equations proposed based on the tortuous hydraulic diameter are also more appropriate and effective.

Ultimately, it is expected that the tortuous hydraulic diameter may contribute to more reliable estimation of feature variables and flow features of porous flow. In addition, the friction factor-based approach method proposed in the present study may be used to easily and accurately calculate properties such as permeability based on a macroscopic and rheological relationship compared to a conventional approach in a microscopic and geometric point of view. Furthermore, since the proposed equations are based on a friction factor (f·Re) relationship, it is expected that the proposed equations are easily extensible to turbulent flow as well as laminar flow.

Abstract

Estimation of permeability of a porous medium has been a major subject of research for a long time in various academic fields, e.g., petroleum gas, nuclear energy, biomechanics, and civil engineering. Nevertheless, a generalized permeability estimation method capable of appropriately considering geometric features of various media and applicable to turbulent flow as well as laminar flow has not been introduced To this end, in the present study, a Darcy friction factor-Reynolds number relationship (f·Re) which is commonly used for general internal friction flow analysis is extensibly applied to porous flow analysis. Consequentially, a generalized Darcy's friction flow equation applicable to porous flow analysis is proposed by combining theories of prior researchers, e.g., Kozeny's hydraulic diameter and Carman's tortuosity-based average flow velocity. In this procedure, it is found that the concept of tortuosity needs to be supplemented to the Kozeny's hydraulic diameter definition to obtain a stricter porous flow equation. As such, a tortuous hydraulic diameter is newly defined and proposed and CFD flow analysis is performed on simple hydraulic fracture models to verify effectiveness and applicability of the tortuous hydraulic diameter. Finally, it is shown that the tortuous hydraulic diameter definition may calculate a result very close to the CFD analysis result and thus correspond to an equation capable of more strictly defining a hydraulic diameter of a porous medium. Ultimately, it is expected that the tortuous hydraulic diameter may contribute to more reliable estimation of permeability and feature variables and flow features of porous flow.

Based on the above-described study, a method of calculating a tortuous hydraulic diameter of a porous medium and a method of analyzing flow in a porous medium, according to the present invention, may be implemented as described below.

FIG. 30 is a flowchart of a method S100 of calculating a tortuous hydraulic diameter of a porous medium, according to an embodiment of the present invention.

Referring to FIG. 30, the method S100 includes providing porosity and a specific surface area of a porous medium (S110), calculating a hydraulic diameter of the porous medium by using the porosity and the specific surface area (S120), calculating tortuosity of the porous medium (S130), and calculating a tortuous hydraulic diameter corresponding to a function of tortuosity, by using the hydraulic diameter and the tortuosity of the porous medium (S140).

FIG. 31 is a flowchart of a method S200 of analyzing flow in a porous medium, according to an embodiment of the present invention.

Referring to FIG. 31, the method S200 includes providing porosity and a specific surface area of a porous medium (S210), calculating a hydraulic diameter of the porous medium by using the porosity and the specific surface area (S220), calculating tortuosity of the porous medium (S230), calculating a tortuous hydraulic diameter corresponding to a function of tortuosity, by using the hydraulic diameter and the tortuosity of the porous medium (S240), calculating a tortuous Reynolds number by using the tortuous hydraulic diameter (S250), and calculating a tortuous friction factor by using the tortuous hydraulic diameter (S260). The method S200 may further include calculating a tortuous friction factor-tortuous Reynolds number relationship by using the tortuous friction factor and the tortuous Reynolds number (S270), and calculating friction equivalent permeability (FEP) by using the tortuous hydraulic diameter and the tortuous friction factor-tortuous Reynolds number relationship (S280).

FIG. 32 is a flowchart of a method S300 of analyzing flow in a porous medium, according to another embodiment of the present invention.

Referring to FIG. 32, the method S300 includes calculating a tortuous hydraulic diameter by using porosity, a specific surface area, and tortuosity of a porous medium (S310), calculating a simulation hydraulic diameter by using a shear stress at wall (S320), and comparing the tortuous hydraulic diameter to the simulation hydraulic diameter (S330).

FIG. 33 is a flowchart of a method S400 of analyzing flow in a porous medium, according to another embodiment of the present invention.

Referring to FIG. 33, the method S400 includes calculating a first tortuous hydraulic diameter of a first porous medium (S410), calculating a tortuous friction factor-tortuous Reynolds number relationship by using the first tortuous hydraulic diameter (S420), calculating a second tortuous hydraulic diameter of a second porous medium different from the first porous medium (S430), and calculating permeability of the second porous medium by applying the second tortuous hydraulic diameter to the tortuous friction factor-tortuous Reynolds number relationship calculated using the first tortuous hydraulic diameter (S440). At least one of porosity, a specific surface area, and tortuosity of the second porous medium may differ from that of the first porous medium. For example, the second porous medium may be of the same type as but have a different geometric condition, e.g., porosity, from the first porous medium.

The present invention can also be embodied as computer-readable code on a computer-readable recording medium. The computer-readable recording medium is any data storage device that can store data which can be thereafter read by a computer system. Examples of the computer-readable recording medium include read-only memory (ROM), random-access memory (RAM), CD-ROMs, magnetic tapes, floppy disks, optical data storage devices, flash memory, and carrier waves (such as data transmission through the Internet). The computer-readable recording medium can also be distributed over network coupled computer systems so that the computer-readable code is stored and executed in a distributed fashion. Herein, a program or code stored in the recording medium is represented as a series of instructions directly or indirectly used in a device having data processing capability, e.g., a computer, to achieve a specific result. Thus, the term "computer" involves all devices including memory, an input/output unit, and an arithmetic unit and having data processing capability to perform a specific function based on the program.

The recording medium may store commands programmed to execute, on a computer, a method of calculating a tortuous hydraulic diameter of a porous medium, the method including providing porosity and a specific surface area of a porous medium, calculating a hydraulic diameter of the porous medium by using the porosity and the specific surface area, calculating tortuosity of the porous medium, and calculating a tortuous hydraulic diameter corresponding to a function of tortuosity, by using the hydraulic diameter and the tortuosity of the porous medium.

The recording medium may store commands programmed to execute, on a computer, a method of analyzing flow in a porous medium, the method including providing porosity and a specific surface area of a porous medium, calculating a hydraulic diameter of the porous medium by using the porosity and the specific surface area, calculating tortuosity of the porous medium, calculating a tortuous hydraulic diameter corresponding to a function of tortuosity, by using the hydraulic diameter and the tortuosity of the porous medium, calculating a tortuous Reynolds number by using the tortuous hydraulic diameter, calculating a tortuous friction factor by using the tortuous hydraulic diameter, calculating a tortuous friction factor-tortuous Reynolds number relationship by using the tortuous friction factor and the tortuous Reynolds number, and calculating friction equivalent permeability (FEP) by using the tortuous hydraulic diameter and the tortuous friction factor-tortuous Reynolds number relationship.

The recording medium may store commands programmed to execute, on a computer, a method of analyzing flow in a porous medium, the method including calculating a tortuous hydraulic diameter by using porosity, a specific surface area, and tortuosity of a porous medium, calculating a simulation hydraulic diameter by using a shear stress at wall, and comparing the tortuous hydraulic diameter to the simulation hydraulic diameter.

The recording medium may store commands programmed to execute, on a computer, a method of analyzing flow in a porous medium, the method including calculating a first tortuous hydraulic diameter of a first porous medium, calculating a tortuous friction factor-tortuous Reynolds number relationship by using the first tortuous hydraulic diameter, calculating a second tortuous hydraulic diameter of a second porous medium different from the first porous medium, and calculating permeability of the second porous medium by applying the second tortuous hydraulic diameter to the tortuous friction factor-tortuous Reynolds number relationship calculated using the first tortuous hydraulic diameter.

While the present invention has been particularly shown and described with reference to embodiments thereof, it will be understood by one of ordinary skill in the art that various changes in form and details may be made therein without departing from the scope of the present invention as defined by the following claims.

The invention claimed is:

1. A method of calculating a tortuous hydraulic diameter of a porous medium, the method comprising:
providing porosity and a specific surface area of a porous medium;
calculating a hydraulic diameter of the porous medium by using the porosity and the specific surface area;
calculating tortuosity of the porous medium; and calculating a tortuous hydraulic diameter corresponding to a function of tortuosity, by using the hydraulic diameter and the tortuosity of the porous medium;
wherein the tortuous hydraulic diameter has a relationship defined by an equation shown below, with the tortuosity:

$$D_{h_T} = D_h \cdot T^{\frac{1}{4}}$$

where $D_{h_T}$ is a tortuous hydraulic diameter, $D_h$ is a hydraulic diameter not considering tortuosity, and T is tortuosity.

2. The method of claim 1, wherein the tortuous hydraulic diameter has a relationship defined by an equation shown below, with the tortuosity.

$$D_{h_T} = \frac{4\phi}{S_{S_T}} = \left(\frac{4\phi}{S_S}\right) \cdot \left(\frac{L}{L_e}\right)^{1/2}$$

where $D_{h_T}$ is a tortuous hydraulic diameter, φ is porosity of a porous medium, $S_{S_T}$ is a specific surface area considering tortuosity, $S_S$ is a specific surface area not considering tortuosity, L is a length of the porous medium, and $L_e$ is a length of an equivalent pore flow path.

3. A method of calculating a tortuous friction factor, the method comprising:
providing porosity and a specific surface area of a porous medium;
calculating a hydraulic diameter of the porous medium by using the porosity and the specific surface area;
calculating tortuosity of the porous medium;
calculating a tortuous hydraulic diameter corresponding to a function of tortuosity, by using the hydraulic diameter and the tortuosity of the porous medium;
calculating a tortuous Reynolds number by using the tortuous hydraulic diameter; and
calculating a tortuous friction factor by using the tortuous hydraulic diameter;
wherein the tortuous hydraulic diameter has a relationship defined by an equation shown below, with the tortuosity:

$$D_{h_T} = D_h \cdot T^{\frac{1}{4}}$$

where $D_{h_T}$ is a tortuous hydraulic diameter, $D_h$ is a hydraulic diameter not considering tortuosity, and T is tortuosity.

4. The method of claim 3, wherein the tortuous Reynolds number has a relationship defined by an equation shown below, with the tortuosity:

$$Re_{v_T} = \frac{\rho v D_{h_T}}{\mu} = \frac{\rho u D_{h_T}}{\phi \mu}\left(\frac{L_e}{L}\right) = Re_{u_T}\phi^{-1}T^{-\frac{1}{2}} = Re_u \phi^{-1}T^{-\frac{1}{4}}$$

where $Re_{v_T}$ is a function of tortuosity and is a tortuous Reynolds number based on a flow velocity v, $Re_{u_T}$ is a function of tortuosity and is a tortuous Reynolds number based on a flow velocity u, $Re_u$ is a Reynolds number not considering tortuosity, ρ is a density, v is a flow velocity of a fluid through an equivalent pore flow path, $D_{h_T}$ is a tortuous hydraulic diameter, μ is viscosity of the fluid, u is a flow velocity of the fluid, φ is porosity of a porous medium, L is a length of the porous medium, $L_e$ is a length of the equivalent pore flow path, and T is tortuosity.

5. The method of claim 3, wherein the tortuous Reynolds number has a relationship defined by an equation shown below, with the tortuosity.

$$Re_{u_T} = \frac{\rho u D_{h_T}}{\mu} = Re_u \cdot T^{\frac{1}{4}}$$

where $Re_{u_T}$ is a function of tortuosity and is a tortuous Reynolds number based on a flow velocity u, $Re_u$ is a Reynolds number not considering tortuosity, ρ is a density, u is a flow velocity of a fluid, $D_{h_T}$ is a tortuous hydraulic diameter, μ is viscosity of the fluid, and T is tortuosity.

6. The method of claim 3, wherein the tortuous friction factor has a relationship defined by an equation shown below, with the tortuosity:

$$f_{v_T} = -\left(\frac{2D_{h_T}}{\rho v^2}\frac{\Delta P}{L_e}\right) = -\left(\frac{2D_{h_T}}{\rho u^2}\frac{\Delta P}{L}\right)\phi^2\left(\frac{L}{L_e}\right)^3$$
$$= f_{u_T}\phi^2 T^{\frac{3}{2}}$$
$$= f_u \phi^2 T^{\frac{7}{4}}$$

where $f_{v_T}$ is a function of tortuosity and is a tortuous friction factor based on a flow velocity v, $f_{u_T}$ is a function of tortuosity and is a tortuous friction factor based on a flow velocity u, $f_u$ is a friction factor not considering tortuosity, $D_{h_T}$ is a tortuous hydraulic diameter, ρ is a density, v is a flow velocity of a fluid through an equivalent pore flow path, $\Delta P/L_e$ is a pressure gradient based on a length of the equivalent pore flow path, u is a flow velocity of the fluid, $\Delta P/L$ is a pressure gradient based on a length of a porous medium, φ is porosity of the porous medium, L is a length of the porous medium, $L_e$ is a length of the equivalent pore flow path, and T is tortuosity.

7. The method of claim 3, wherein the tortuous friction factor has a relationship defined by an equation shown below, with the tortuosity:

$$f_{u_T} = -\left(\frac{2D_{h_T}}{\rho u^2}\frac{\Delta P}{L}\right) = -\left(\frac{2D_h}{\rho u^2}\frac{\Delta P}{L}\right)\left(\frac{L}{L_e}\right)$$
$$= f_u \cdot T^{\frac{1}{4}}$$

where $f_{u_T}$ is a function of tortuosity and is a tortuous friction factor based on a flow velocity u, $f_u$ is a friction factor not considering tortuosity, $D_{h_T}$ is a tortuous hydraulic diameter, ρ is a density, u is a flow velocity of a fluid, ΔP/L is a pressure gradient based on a length of a porous medium, $D_h$ is a hydraulic diameter not considering tortuosity, L is a length of the porous medium, $L_e$ is a length of an equivalent pore flow path, and T is tortuosity.

8. The method of claim 3, wherein the tortuous hydraulic diameter has a relationship defined by an equation shown below.

$$D_{h_T} = \frac{4\phi}{S_{S_T}} = \left(\frac{4\phi}{S_S}\right)\cdot\left(\frac{L}{L_e}\right)^{1/2}$$

where $D_{h_T}$ is a tortuous hydraulic diameter, φ is porosity of a porous medium, $S_{S_T}$ is a specific surface area considering tortuosity, $S_S$ is a specific surface area not considering tortuosity, L is a length of the porous medium, and $L_e$ is a length of an equivalent pore flow path.

9. The method of claim 3, wherein a flow velocity of a fluid in the porous medium has a relationship defined by an equation shown below.

$$u = -\frac{2D_{h_T}^2 \cdot \phi T}{\mu \cdot f_{v_T} Re_{v_T}}\frac{\Delta P}{L}$$

where u is a flow velocity of a fluid, $D_{h_T}$ is a tortuous hydraulic diameter, φ is porosity of a porous medium, T is tortuosity, μ is viscosity of the fluid, v is a flow velocity of the fluid through an equivalent pore flow path, $f_{v_T}$ is a function of tortuosity and is a tortuous friction factor based on the flow velocity v, $Re_{v_T}$ is a function of tortuosity and is a tortuous Reynolds number based on the flow velocity v, and ΔP/L is a pressure gradient based on a length.

10. The method of claim 3, wherein a flow velocity of a fluid in the porous medium has a relationship defined by an equation shown below.

$$u = -\frac{2D_{h_T}^2}{\mu \cdot f_{u_T} Re_{u_T}}\frac{\Delta P}{L}$$

where u is a flow velocity of a fluid, μ is viscosity of the fluid, $f_{u_T}$ is a function of tortuosity and is a tortuous friction factor based on the flow velocity u, $Re_{u_T}$ is a function of tortuosity and is a tortuous Reynolds number based on the flow velocity u, $D_{h_T}$ is a tortuous hydraulic diameter, and ΔP/L is a pressure gradient based on a length.

11. The method of claim 3, further comprising calculating a tortuous friction factor-tortuous Reynolds number relationship by using the tortuous friction factor and the tortuous Reynolds number, after calculating the tortuous friction factor.

12. The method of claim 11, wherein the tortuous friction factor-tortuous Reynolds number relationship is defined by an equation shown below.

$$f_{v_T} Re_{v_T} = -\left(\frac{2D_{h_T}}{\rho v^2}\frac{\Delta P}{L_e}\right)\left(\frac{\rho v D_{h_T}}{\mu}\right) = -\left(\frac{2D_{h_T}^2}{\mu \cdot u}\frac{\Delta P}{L}\right)\phi\left(\frac{L}{L_e}\right)^2$$
$$= f_{u_T} Re_{u_T} \cdot \phi T$$

where $f_{v_T}$ is a function of tortuosity and is a tortuous friction factor based on a flow velocity v, $f_{u_T}$ is a function of tortuosity and is a tortuous friction factor based on a flow velocity u, $Re_{v_T}$ is a function of tortuosity and is a tortuous Reynolds number based on the flow velocity v, $Re_{u_T}$ is a function of tortuosity and is a tortuous Reynolds number based on the flow velocity u, $D_{h_T}$ is a tortuous hydraulic diameter, ρ is a density, v is a flow velocity of a fluid through an equivalent pore flow path, $\Delta P/L_e$ is a pressure gradient based on a length of the equivalent pore flow path, μ is viscosity of the fluid, u is a flow velocity of the fluid, ΔP/L is a pressure gradient based on a length of a porous medium, φ is porosity of the porous medium, L is a length of the porous medium, $L_e$ is a length of the equivalent pore flow path, and T is tortuosity.

13. The method of claim 11, further comprising calculating friction equivalent permeability (FEP) by using the tortuous hydraulic diameter and the tortuous friction factor-tortuous Reynolds number relationship, after calculating the tortuous friction factor-tortuous Reynolds number relationship.

14. The method of claim 13, wherein the FEP has a relationship defined by an equation shown below.

$$k_{FEP_T} = \frac{2D_{h_T}^2 \cdot \phi T}{f_{v_T} Re_{v_T}}$$

where $k_{FEP_T}$ is FEP considering tortuosity, v is a flow velocity of a fluid through an equivalent pore flow path, $D_{h_T}$ is a tortuous hydraulic diameter, φ is porosity of a porous medium, T is tortuosity, $f_{v_T}$ is a function of tortuosity and is a tortuous friction factor based on the flow velocity v, and $Re_{v_T}$ is a function of tortuosity and is a tortuous Reynolds number based on the flow velocity v.

15. The method of claim 13, wherein the FEP has a relationship defined by an equation shown below.

$$k_{FEP_T} = \frac{2D_{h_T}^2}{f_{u_T} Re_{u_T}}$$

where $k_{FEP_T}$ is FEP considering tortuosity, u is a flow velocity of a fluid, $D_{h_T}$ is a tortuous hydraulic diameter, $f_{u_T}$ is a function of tortuosity and is a tortuous friction factor based on the flow velocity u, and $Re_{u_T}$ is a function of tortuosity and is a tortuous Reynolds number based on the flow velocity u.

16. A method of validating a tortuous hydraulic diameter of a porous medium, the method comprising:
calculating a tortuous hydraulic diameter by using porosity, a specific surface area, and tortuosity of a porous medium;
calculating a simulation hydraulic diameter by using a shear stress at wall;
comparing the tortuous hydraulic diameter to the simulation hydraulic diameter; and
determining that the calculated tortuous hydraulic diameter is valid if it agrees with the simulation hydraulic diameter to within a predetermined threshold;
wherein the tortuous hydraulic diameter has a relationship defined by an equation shown below, with the tortuosity:

$$D_{h_T} = D_h \cdot T^{\frac{1}{4}}$$

where $D_{hT}$ is a tortuous hydraulic diameter, $D_h$ is a hydraulic diameter not considering tortuosity, and T is tortuosity.

17. The method of claim 16, wherein the simulation hydraulic diameter has a relationship defined by an equation shown below, with the shear stress at wall.

$$D_{CFD} = 4\tau_w \left(\frac{L}{\Delta P}\right)\left(\frac{\phi v}{u}\right)$$

where $D_{CFD}$ is a simulation hydraulic diameter, $\tau_w$ is a shear stress at wall, $\Delta P/L$ is a pressure gradient based on a length of a porous medium, $\varphi$ is porosity of the porous medium, v is a flow velocity of a fluid through an equivalent pore flow path, and u is a flow velocity of the fluid.

18. A method of calculating permeability of a porous medium, the method comprising:
calculating a first tortuous hydraulic diameter of a first porous medium;
calculating a tortuous friction factor-tortuous Reynolds number relationship by using the first tortuous hydraulic diameter;
calculating a second tortuous hydraulic diameter of a second porous medium different from the first porous medium; and
calculating permeability of the second porous medium by applying the second tortuous hydraulic diameter to the tortuous friction factor-tortuous Reynolds number relationship calculated using the first tortuous hydraulic diameter;
wherein the tortuous hydraulic diameter has a relationship defined by an equation shown below, with the tortuosity:

$$D_{h_T} = D_h \cdot T^{\frac{1}{4}}$$

where $D_{hT}$ is a tortuous hydraulic diameter, $D_h$ is a hydraulic diameter not considering tortuosity, and T is tortuosity.

19. The method of claim 18, wherein the calculating of the permeability is performed using an equation shown below.

$$k_{FEP_T} = \frac{2D_{h_T}^2}{f_{u_T} Re_{u_T}}$$

where $k_{FEPT}$ is friction equivalent permeability (FEP) considering tortuosity, u is a flow velocity of a fluid, $D_{hT}$ is a second tortuous hydraulic diameter, $f_{uT}$ is a a function of tortuosity and is a tortuous friction factor based on the flow velocity u, and $Re_{uT}$ is a function of tortuosity and is a tortuous Reynolds number based on the flow velocity u.

20. The method of claim 18, wherein at least one of porosity, a specific surface area, and tortuosity of the second porous medium differs from that of the first porous medium.

* * * * *